(12) United States Patent
Chatterjee et al.

(10) Patent No.: US 12,412,289 B2
(45) Date of Patent: Sep. 9, 2025

(54) MULTI-MODAL IMAGE REGISTRATION VIA MODALITY-NEUTRAL MACHINE LEARNING TRANSFORMATION

(71) Applicant: GE Precision Healthcare LLC, Milwaukee, WI (US)

(72) Inventors: Sudhanya Chatterjee, Bengaluru (IN); Dattesh Dayanand Shanbhag, Bangalore (IN); Krishna Seetharam Shriram, Bengaluru (IN)

(73) Assignee: GE Precision Healthcare LLC, Waukesha, WI (US)

( * ) Notice: Subject to any disclaimer, the term of this patent is extended or adjusted under 35 U.S.C. 154(b) by 694 days.

(21) Appl. No.: 17/648,696

(22) Filed: Jan. 24, 2022

(65) Prior Publication Data
US 2023/0260142 A1    Aug. 17, 2023

(51) Int. Cl.
*G06T 7/33* (2017.01)

(52) U.S. Cl.
CPC .... *G06T 7/344* (2017.01); *G06T 2207/20081* (2013.01); *G06T 2207/20084* (2013.01)

(58) Field of Classification Search
CPC .......... G06T 7/344; G06T 2207/20081; G06T 2207/20084; G06T 2207/10072; G06T 7/33; G06T 7/30; G06T 2207/10081; G06T 2207/10088; G06T 2207/10116; G06T 2207/10132; G06T 7/38; G06T 3/02; G06T 3/14; F03D 7/046; G06N 3/08

(Continued)

(56) References Cited

U.S. PATENT DOCUMENTS

| 2015/0320400 A1* | 11/2015 | Kim | G06T 3/14 600/407 |
| 2016/0093048 A1* | 3/2016 | Cheng | G06V 10/82 382/131 |

(Continued)

OTHER PUBLICATIONS

Chatterjee, Soumick et al. | "A Comparative Study of Deep Learning Based Deformable Image Registration Techniques". ISMRM 2021, 3 pages.

(Continued)

*Primary Examiner* — Jennifer Mehmood
*Assistant Examiner* — Pardis Sohraby
(74) *Attorney, Agent, or Firm* — Amin, Turocy & Watson, LLP

(57) ABSTRACT

Systems/techniques that facilitate multi-modal image registration via modality-neutral machine learning transformation are provided. In various embodiments, a system can access a first image and a second image, where the first image can depict an anatomical structure according to a first imaging modality, and where the second image can depict the anatomical structure according to a second imaging modality that is different from the first imaging modality. In various aspects, the system can generate, via execution of a machine learning model on the first image and the second image, a modality-neutral version of the first image and a modality-neutral version of the second image. In various instances, the system can register the first image with the second image, based on the modality-neutral version of the first image and the modality-neutral version of the second image.

17 Claims, 19 Drawing Sheets
(4 of 19 Drawing Sheet(s) Filed in Color)

(58) Field of Classification Search
USPC .......................................................... 382/154
See application file for complete search history.

(56) References Cited

U.S. PATENT DOCUMENTS

| | | | | |
|---|---|---|---|---|
| 2018/0260950 | A1* | 9/2018 | Samset | G06T 7/0012 |
| 2020/0245960 | A1* | 8/2020 | Richter | A61B 6/507 |
| 2020/0250814 | A1* | 8/2020 | Stoval, III | G06N 3/04 |
| 2020/0327662 | A1* | 10/2020 | Liu | G16H 30/40 |
| 2021/0150714 | A1* | 5/2021 | Buerger | G06V 10/24 |
| 2023/0123621 | A1* | 4/2023 | Joshi | G06V 10/26 |
| | | | | 382/131 |

OTHER PUBLICATIONS

Haskins, Grant et al. | "Deep learning inmedical image registration: a survey". Machine Vision and Applications 31.1 (2020): 1-18, https://doi.org/10.1007/s00138-020-01060-x, 18 pages.

Rohe, Marc-Michel et al. | "SVF-Net: Learning Deformable Image Registration Using Shape Matching" MICCAI 2017—the 20th International Conference on Medical Image Computing and Computer Assisted Intervention, Sep. 2017, Quebec, Canada. pp. 266-274, 10.1007/978-3-319-66182-7_31, hal-01557417, 9 pages.

Hu, Yipeng et al. | "Weakly-supervised convolutional neural networks for multimodal image registration" Medical image analysis 49 (2018): 1-13, 13 pages.

Balakrishnan, G. et al. | "VoxelMorph: A Learning Framework for Deformable Medical Image Registration". Guha, et al., arXiv:1809.05231v3 [cs.CV] Sep. 1, 2019, 16 pages.

Kori, A. et al. | "Zero Shot Learning for Multi-Modal Real Time Image Registration". arXiv:1908.06213v1 [cs.CV] Aug. 17, 2019, 9 pages.

Jiang, Dongsheng et al. | "Fast and robust multimodal image registration using a local derivative pattern". Medical Physics, 44 (2), Feb. 2017, 13 pages.

Zhu, F. et al | "Deep learning based data-adaptive descriptor for non-rigid multi-modal medical image registration". https://doi.org/10.1016/j.sigpro.2021.108023, Signal Processing 183 (2021) 108023, 13 pages.

Chen, X. et al. | "Deep learning in medical image registration". 2021 Prog. Biomed. Eng. 3 012003, 29 pages.

\* cited by examiner

MULTI-MODAL IMAGE REGISTRATION VIA MODALITY-NEUTRAL MACHINE LEARNING TRANSFORMATION

TECHNICAL FIELD

The subject disclosure relates generally to image registration, and more specifically to multi-modal image registration via modality-neutral machine learning transformation.

BACKGROUND

Image registration is the process of aligning one image with another image, such that both images have corresponding orientations or feature locations. Analytical image registration is very time-consuming, whereas deep learning image registration is much less time-consuming. However, deep learning image registration can be accurately applied only to images that are sufficiently similar to those on which such deep learning image registration was trained. Deep learning image registration is most often trained on images that are all generated by a single imaging modality. But, in clinical practice, two different images that depict the same anatomical structure are often generated by two different imaging modalities. Unfortunately, deep learning image registration that is trained on mono-modal training datasets cannot be accurately applied to such multi-modal images. Moreover, efforts to train deep learning image registration on multi-modal training datasets have achieved very limited success. Therefore, when existing techniques are implemented, deep learning image registration cannot accurately register images that come from different imaging modalities.

Accordingly, systems and/or techniques that can address one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate multi-modal image registration via modality-neutral machine learning transformation are described.

According to one or more embodiments, a system is provided. The system can comprise a computer-readable memory that can store computer-executable components. The system can further comprise a processor that can be operably coupled to the computer-readable memory and that can execute the computer-executable components stored in the computer-readable memory. In various embodiments, the computer-executable components can comprise a receiver component. In various aspects, the receiver component can access a first image and a second image, where the first image can depict an anatomical structure according to a first imaging modality, and where the second image can depict the anatomical structure according to a second imaging modality that is different from the first imaging modality. In various instances, the computer-executable components can further comprise a modality-neutral component. In various cases, the modality-neutral component can generate, via execution of a machine learning model on the first image and the second image, a modality-neutral version of the first image and a modality-neutral version of the second image. In various aspects, the computer-executable components can further comprise an execution component. In various instances, the execution component can register the first image with the second image, based on the modality-neutral version of the first image and the modality-neutral version of the second image.

According to one or more embodiments, the above-described system can be implemented as a computer-implemented method and/or a computer program product.

DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
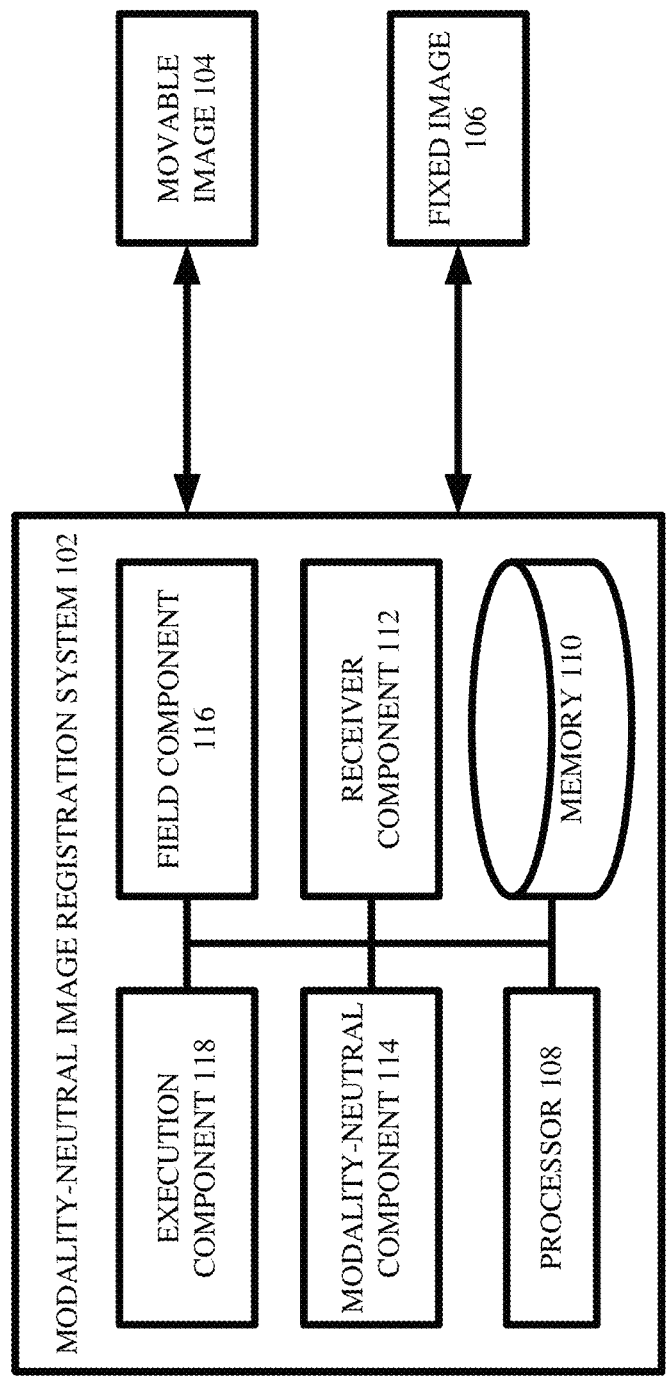
FIG. 1 illustrates a block diagram of an example, non-limiting system that facilitates multi-modal image registration via modality-neutral machine learning transformation in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Image registration is the process of aligning one image (e.g., a two-dimensional pixel array, or a three-dimensional voxel array, or even a four-dimensional voxel array) with another image (e.g., also a two-dimensional pixel array, or also a three-dimensional voxel array, or also a four-dimensional voxel array), such that both images have corresponding orientations (e.g., such that the structures and/or features depicted in the two images have the same orientations and/or locations as each other).

Analytical image registration can be very time-consuming. Specifically, analytical image registration can register a first image (e.g., referred to as a "movable image") with a second image (e.g., referred to as a "fixed image") by performing a lengthy, iterative perturbation procedure on the first image. Thus, when it is desired to perform registration on many pairs of images, analytical image registration can require performing such lengthy, iterative perturbation procedure for each desired pair of images, which can ultimately consume excessive time and/or resources.

Deep learning image registration, on the other hand, can be much less time-consuming. Indeed, as those having ordinary skill in the art will appreciate, deep learning image registration can involve training a deep learning neural network to receive as input both a movable image and a fixed image, and to produce as output a registration field (e.g., also referred to as a "deformation field"), where the registration field can be a vector field indicating how specific pixels and/or voxels of the movable image should be geometrically translated, transformed, and/or shifted so as to become aligned with the fixed image. Accordingly, once trained, the deep learning neural network can function/operate (e.g., during inference time) without lengthy and/or time-consuming iteration, unlike analytical image registration. However, the deep learning neural network can be accurately executed only on images that are sufficiently similar to those on which the deep learning neural network was trained.

Deep learning image registration is most often trained on images that are all generated by a single imaging modality (e.g., by a single type of imaging scanner and/or image capture device). For example, a deep learning registration neural network can be trained on images that are all generated by computed tomography (CT) scanners. In such case, the deep learning registration neural network can, once trained, be able to accurately register a CT-generated image with another CT-generated image. However, the deep learning registration neural network can, even after training, be unable to accurately register a CT-generated image with an image that is generated by a different imaging modality (e.g., that is generated by a different type of imaging scanner, such as a magnetic resonance imaging (MRI) scanner, an X-ray scanner, a positron emission tomography (PET) scanner, and/or an ultrasound scanner). This shortcoming is due to the fact that different imaging modalities can yield images with significantly different pixel/voxel intensity distributions. For example, a given imaging modality (e.g., MRI) can represent bone tissue with dark and/or low intensity values (e.g., low Hounsfield unit magnitudes) and can represent soft tissue with light and/or high intensity values (e.g., high Hounsfield unit magnitudes), whereas a different imaging modality (e.g., CT) can represent bone tissue with light and/or high intensity values (e.g., high Hounsfield unit magnitudes) and can represent soft tissue with dark and/or low intensity values (e.g., low Hounsfield unit magnitudes). So, if the deep learning registration neural network is trained to handle only pixel/voxel intensity distributions that are associated with a particular imaging modality, the deep learning registration neural network can fail to learn how to handle the significantly different pixel/voxel intensity distributions that are associated with different imaging modalities. Thus, a deep learning registration neural network that is trained on a mono-modal image dataset cannot accurately register multi-modal images.

Some efforts have been made to train deep learning registration neural networks on multi-modal image datasets. However, such efforts have achieved only very limited success (e.g., have achieved insufficient accuracy and/or precision levels). More specifically, such efforts have involved training a deep learning neural network to receive as input both a movable image generated by one imaging modality and a fixed image generated by a different imaging modality (e.g., these inputted images can be referred to as "multi-modal images"), and to produce as output a registration field that indicates how pixels/voxels of the movable image should be shifted to become aligned with those of the fixed image. Such training essentially requires the deep learning neural network to learn how to handle structure/feature misalignment between the two inputted images while simultaneously being unaffected by pixel/voxel intensity mismatches between the two inputted images. In stark contrast, training on a mono-modal dataset only requires the deep learning neural network to learn how to handle structure/feature misalignments and not intensity distribution mismatches, since mono-modal images have similar intensity distributions. Unfortunately, training the deep learning neural network to handle both structure/feature misalignments and intensity distribution mismatches is exceptionally difficult and requires the use of complicated loss functions (e.g., normalized cross correlation). Moreover, because a deep learning neural network is limited by the data on which it is trained, such multi-modal training also requires an extremely large and varied training dataset that is representative of the full range of pixel/voxel intensity distribution variation which the deep learning neural network might encounter during deployment (e.g., that is, the training dataset should include examples of all possible structure/feature misalignments and all possible intensity distribution mismatches that the deep learning neural network is likely to encounter when deployed in the field). Unfortunately, such a large and varied training dataset can be excessively difficult to obtain in practice.

In any case, deep learning image registration cannot be accurately applied to multi-modal images when existing techniques are implemented. This can be problematic since it can often be desired in clinical practice to register multi-modal images (e.g., to register one image depicting an anatomical structure of a patient with another image depicting that same anatomical structure of the same patient but that was generated by a different imaging modality).

Accordingly, systems and/or techniques that can address one or more of these technical problems can be desirable.

Various embodiments of the subject innovation can address one or more of these technical problems. One or more embodiments described herein can include systems, computer-implemented methods, apparatus, and/or computer program products that can facilitate multi-modal image registration via modality-neutral machine learning transformation. In various aspects, the inventors of various embodiments described herein recognized that deep learning image registration can be accurately applied to mono-modal images but cannot be accurately applied to multi-modal images when existing techniques are implemented. Specifically, the present inventors recognized that deep learning image registration cannot be accurately applied to multi-modal images when existing techniques are implemented precisely because of the significant pixel/voxel intensity distribution mismatches that exist between multi-modal images (e.g., between images that are generated by different imaging modalities). Accordingly, the present inventors devised various embodiments described herein, which can convert and/or transform multi-modal images into modality-neutral representations, where such modality-neutral representations can have similar (rather than mismatching) pixel/voxel intensity distributions. Because such modality-neutral representations can have similar pixel/voxel intensity distributions, deep learning image registration can be accurately applied to such modality-neutral representations. In other words, the present inventors have devised a technique that enables deep learning image registration to be accurately applied to multi-modal images, where such technique can be summarized as follows: obtain a pair of multi-modal images that are desired to be registered with each other; generate modality-neutral representations of the pair of multi-modal images; and apply deep learning image registration to the modality-neutral representations. In various cases, such modality-neutral representations can be generated via deep learning, as described more thoroughly herein.

In various aspects, various embodiments described herein can be considered as a computerized tool (e.g., any suitable combination of computer-executable hardware and/or computer-executable software) that can facilitate multi-modal image registration via modality-neutral machine learning transformation. In various aspects, the computerized tool can comprise a receiver component, a modality-neutral component, a field component, and/or an execution component.

In various embodiments, the receiver component of the computerized tool can electronically receive and/or otherwise electronically access a movable image and a fixed image. In some instances, the receiver component can electronically retrieve the movable image and/or the fixed image from any suitable centralized and/or decentralized data structure (e.g., graph data structure, relational data structure, hybrid data structure), whether remote from and/or local to the receiver component. In other instances, the receiver component can electronically retrieve the movable image and/or the fixed image from any suitable imaging devices (e.g., X-ray scanners, CT scanners, MRI scanners, ultrasound scanners, PET scanners) that captured/generated the movable image and/or the fixed image. In any case, the receiver component can electronically obtain and/or access the movable image and/or the fixed image, such that other components of the computerized tool can electronically interact with (e.g., read, write, edit, manipulate) the movable image and/or the fixed image.

In various aspects, the movable image can be any suitable two-dimensional pixel array and/or any suitable three-dimensional voxel array, that depicts any suitable anatomical structure (e.g., body part, organ, tissue, and/or any suitable portion thereof) of a patient (e.g., human, animal, and/or otherwise). Moreover, in various instances, the movable image can be generated by, captured by, and/or otherwise associated with a first imaging modality (e.g., one of a CT scanner, an MRI scanner, an X-ray scanner, an ultrasound scanner, a PET scanner). In various cases, the fixed image can be any suitable image that corresponds to the movable image. For example, the fixed image can have the same dimensionality as the movable image (e.g., if the movable image is a two-dimensional pixel array, then the fixed image can likewise be a two-dimensional pixel array that has the same number and/or layout of pixels as the movable image; if the movable image is a three-dimensional voxel array, then the fixed image can likewise be a three-dimensional voxel array that has the same number and/or layout of voxels as the movable image). Moreover, the fixed image can depict the same anatomical structure as the movable image, although the anatomical structure as depicted in the fixed image can have a different location and/or orientation than as depicted in the movable image. However, in various aspects, the fixed image can be generated by, captured by, and/or otherwise associated with a second imaging modality that is different from the first imaging modality (e.g., the movable image and the fixed image can be not both generated by CT scanners, can be not both generated by MRI scanners, can be not both generated by X-ray scanners, can be not both generated by ultrasound scanners, can be not both generated by PET scanners). Accordingly, the pixel/ voxel intensity distribution of the fixed image can differ (e.g., by any suitable threshold margin) from that of the movable image. In any case, it can be desired to register and/or align the movable image with the fixed image. In various aspects, the computerized tool described herein can facilitate such registration and/or alignment, as explained below.

In various embodiments, the modality-neutral component of the computerized tool can electronically store, electronically maintain, electronically control, and/or otherwise electronically access a machine learning model. In various aspects, the machine learning model can exhibit any suitable artificial intelligence architecture as desired. For example, the machine learning model can exhibit a deep learning neural network architecture (e.g., a convolutional neural network). In such case, the machine learning model can include any suitable number of layers (e.g., input layer, one or more hidden layers, output layer), can include any suitable numbers of neurons in various layers (e.g., different layers can have the same and/or different numbers of neurons as each other), can include any suitable activation functions (e.g., softmax, sigmoid, hyperbolic tangent, rectified linear unit) in various neurons (e.g., different neurons can have the same and/or different activation functions as each other), and/or can include any suitable interneuron connections (e.g., forward connections, skip connections, recurrent connections).

In any case, the machine learning model can be configured to receive as input both the movable image and the fixed image, and to produce as output a modality-neutral version of the movable image and a modality-neutral version of the fixed image.

In various aspects, the modality-neutral version of the movable image can be an image that has the same dimensionality as the movable image (e.g., that has the same size, shape, and/or number of pixels/voxels as the movable image) and that depicts the same anatomical structure as the movable image (e.g., the orientation and/or location of the anatomical structure as depicted in the modality-neutral version of the movable image can be the same as the orientation and/or location of the anatomical structure as depicted in the movable image). However, the modality-neutral version of the movable image can have a different pixel/voxel intensity distribution as compared to the movable image. Accordingly, the machine learning model can, in some cases, be considered as transforming and/or changing the pixel/voxel intensity distribution of the movable image without eliminating/erasing the structures/features depicted in the movable image.

Likewise, in various instances, the modality-neutral version of the fixed image can be an image that has the same dimensionality as the fixed image (e.g., that has the same size, shape, and/or number of pixels/voxels as the fixed image) and that depicts the same anatomical structure as the fixed image (e.g., the orientation and/or location of the anatomical structure as depicted in the modality-neutral version of the fixed image can be the same as the orientation and/or location of the anatomical structure as depicted in the fixed image). But, the modality-neutral version of the fixed image can have a different pixel/voxel intensity distribution as compared to the fixed image. Thus, the machine learning model can, in some cases, be considered as transforming and/or changing the pixel/voxel intensity distribution of the fixed image without eliminating/erasing the structures/features depicted in the fixed image.

As mentioned above, the intensity distribution of the movable image can differ (e.g., by more than any suitable threshold margin, as measured by cross-correlation, by Earth Mover's distance, or by any other suitable histogram mismatch value) from the intensity distribution of the fixed image, due to the fact that the movable image and the fixed image are associated with different imaging modalities. In various aspects, however, the intensity distribution of the modality-neutral version of the movable image can differ less (e.g., by less than the threshold margin, as measured by cross-correlation, by Earth Mover's distance, or by any other suitable histogram mismatch value) from the intensity distribution of the modality-neutral version of the fixed image. In other words, the movable image and the fixed image can have significantly different pixel/voxel intensity distributions, but the machine learning model can be configured so as to transform the movable image and the fixed image such that they now have similar pixel/voxel intensity distributions. In still other words, the movable image and the fixed image can have apparent visual differences that are due to the movable image and the fixed image not being generated by the same imaging modality, and the machine learning model can be considered as generating versions of the movable image and the fixed image that lack such apparent visual differences.

In any case, the modality-neutral component can electronically generate the modality-neutral version of the movable image and the modality-neutral version of the fixed image by executing the machine learning model on the movable image and on the fixed image. More specifically, in various instances, the movable image and the fixed image can be concatenated together and fed to an input layer of the machine learning model, the movable image and the fixed image can complete a forward pass through one or more hidden layers of the machine learning model, and an output layer of the machine learning model can compute the modality-neutral version of the movable image and the modality-neutral version of the fixed image based on activations from the one or more hidden layers.

In various embodiments, the field component of the computerized tool can electronically generate a registration field based on the modality-neutral version of the movable image and the modality-neutral version of the fixed image. In various aspects, the registration field can be a vector field that indicates how pixels/voxels of the modality-neutral version of the movable image (e.g., and/or of the modality-neutral version of the fixed image, such as in cases where inverse field mapping is applied) should be shifted, translated, and/or otherwise transformed, so that the anatomical structure depicted in the modality-neutral version of the movable image can become aligned with the anatomical structure depicted in the modality-neutral version of the fixed image.

For example, if the movable image is an a-by-b pixel array for any suitable positive integers a and b, then: the fixed image can likewise be an a-by-b pixel array; the modality-neutral version of the movable image can likewise be an a-by-b pixel array; the modality-neutral version of the fixed image can likewise be an a-by-b pixel array; and the registration field can be an a-by-b matrix, where each element of such matrix can be a shift vector indicating a direction in which and/or a magnitude by which a respective pixel of the modality-neutral version of the movable image should be translated and/or shifted.

As another example, if the movable image is an a-by-b-by-c voxel array for any suitable positive integers a, b, and c, then: the fixed image can likewise be an a-by-b-by-c voxel array; the modality-neutral version of the movable image can likewise be an a-by-b-by-c voxel array; the modality-neutral version of the fixed image can likewise be an a-by-b-by-c voxel array; and the registration field can be an a-by-b-by-c tensor, where each element of such tensor can be a shift vector indicating a direction in which and/or a magnitude by which a respective voxel of the modality-neutral version of the movable image should be translated and/or shifted.

In various aspects, the field component can generate the registration field by applying any suitable registration techniques to the modality-neutral version of the movable image and the modality-neutral version of the fixed image. As a non-limiting example, the field component can, in some cases, derive the registration field by applying any suitable analytical registration techniques to the modality-neutral version of the movable image and to the modality-neutral version of the fixed image.

As another non-limiting example, the field component can, in other cases, generate the registration field by executing a deep learning registration neural network on the modality-neutral version of the movable image and the modality-neutral version of the fixed image. In such case, the deep learning registration neural network can include any suitable number of layers (e.g., input layer, one or more hidden layers, output layer), can include any suitable numbers of neurons in various layers (e.g., different layers can have the same and/or different numbers of neurons as each other), can include any suitable activation functions (e.g., softmax, sigmoid, hyperbolic tangent, rectified linear unit) in various neurons (e.g., different neurons can have the same and/or different activation functions as each other), and/or can include any suitable interneuron connections (e.g., forward connections, skip connections, recurrent connections). Moreover, in such case, the deep learning neural network can be configured to receive as input both the modality-neutral version of the movable image and the modality-neutral version of the fixed image, and to produce as output the registration field. More specifically, the modality-neutral version of the movable image and the modality-neutral version of the fixed image can be concatenated together, such concatenation can complete a forward pass through one or more hidden layers of the deep learning registration neural network, and an output layer of the deep learning registration neural network can compute the registration field based on activations from the one or more hidden layers. Those having ordinary skill in the art will appreciate that such a deep learning registration neural network can be trained in any suitable fashion (e.g., supervised training, unsupervised training, reinforcement learning) to generate registration fields based on inputted image pairs.

In various embodiments, the execution component of the computerized tool can electronically generate a registered image based on the registration field, where the registered image can be considered as a version of the movable image that is aligned with the fixed image. As mentioned above, the registration field can be a pixel-wise and/or voxel-wise vector field indicating how each pixel/voxel of the modality-neutral version of the movable image should be moved/shifted, so as to become in alignment with the modality-neutral version of the fixed image. Accordingly, in various cases, the execution component can generate the registered image by applying the registration field to the movable image itself (e.g., rather than applying the registration field to the modality-neutral version of the movable image). In other words, the execution component can shift and/or translate the pixels/voxels of the movable image as indicated by the shift vectors of the registration field, and the ultimate result of such shifting and/or translating can be the regis-tered image. In various instances, the execution component can electronically transmit the registered image to any suitable computing device as desired and/or can electronically render the registered image on any suitable computing monitor, display, and/or screen as desired.

In some other embodiments, the computerized tool can further comprise a training component that can train the machine learning model of the modality-neutral component so that the machine learning model can learn how to accurately infer modality-neutral versions of inputted pairs of images. Such training is described in more detail further below.

In any case, the computerized tool described herein can, in various embodiments, register the movable image with the fixed image via deep learning image registration, notwithstanding that the movable image and the fixed image are associated with different imaging modalities. More specifically, the computerized tool can generate, via a machine learning model, modality-neutral versions of the movable image and the fixed image, the computerized tool can compute a registration field based on such modality-neutral versions of the movable image and the fixed image, and the computerized tool can register the movable image with the fixed image based on the registration field.

Various embodiments of the subject innovation can be employed to use hardware and/or software to solve problems that are highly technical in nature (e.g., to facilitate multi-modal image registration via modality-neutral machine learning transformation), that are not abstract and that cannot be performed as a set of mental acts by a human. Further, some of the processes performed can be performed by a specialized computer (e.g., deep learning neural networks) for carrying out defined tasks related to multi-modal image registration. For example, such defined tasks can include: accessing, by a device operatively coupled to a processor, a first image and a second image, wherein the first image depicts an anatomical structure according to a first imaging modality, and wherein the second image depicts the anatomical structure according to a second imaging modality that is different from the first imaging modality; generating, by the device and via execution of a machine learning model on the first image and the second image, a modality-neutral version of the first image and a modality-neutral version of the second image; and registering, by the device, the first image with the second image, based on the modality-neutral version of the first image and the modality-neutral version of the second image.

Such defined tasks are not performed manually by humans. Indeed, neither the human mind nor a human with pen and paper can electronically receive two multi-modal images, electronically execute a machine learning model (e.g., a neural network) on the two multi-modal images thereby yielding modality-neutral representations of those two multi-modal images, electronically generate a registration field based on the modality-neutral representations of the two multi-modal images, and electronically leverage the registration field to register the two multi-modal images with each other. Instead, various embodiments of the subject innovation are inherently and inextricably tied to computer technology and cannot be implemented outside of a computing environment (e.g., image registration is an inherently-computerized technique by which disparate pixel/voxel arrays are electronically aligned with each other so as to have comparable orientations; a computerized tool that utilizes a deep learning neural network to facilitate image registration is likewise inherently computerized and cannot be implemented in any sensible, practical, or reasonable way without computers).

Moreover, various embodiments of the subject innovation can integrate into a practical application various teachings described herein relating to multi-modal image registration via modality-neutral machine learning transformation. As explained above, existing techniques are unable to accurately apply deep learning image registration to multi-modal images. Specifically, when two images are associated with different imaging modalities (e.g., one can be a CT image, and the other can be an MRI image), the two images can exhibit significantly different pixel/voxel intensity distributions. Because most deep learning image registration models are trained on mono-modal datasets (e.g., trained on images that are all generated by a single type of imaging modality), such deep learning image registration models cannot be accurately applied to multi-modal images (e.g., such deep learning image registration models have learned how to handle only depicted feature mismatches between inputted images that have similar intensity distributions; such deep learning image registration models have not learned how to handle both depicted feature mismatches and intensity distribution mismatches between inputted images). Furthermore, attempts to train such deep learning image registration models on multi-modal datasets have achieved only limited success (e.g., multi-modal training requires very complicated loss functions and very large, diverse training datasets that are difficult to obtain in practice). Accordingly, existing techniques are unable to accurately apply deep learning image registration to multi-modal images.

In stark contrast, the present inventors devised the subject innovation, which can facilitate multi-modal image registration via modality-neutral machine learning transformation. In other words, various embodiments described herein can leverage a machine learning model (e.g., a deep learning neural network) to generate modality-neutral versions of an inputted pair of multi-modal images. Although the inputted pair of multi-modal images can have significantly different intensity distributions, the outputted modality-neutral versions of those images can have similar intensity distributions. In other words, the intensity distributions of the outputted modality-neutral versions can be as if the modality-neutral versions were generated/captured by the same imaging modality. Accordingly, because the outputted modality-neutral versions of multi-modal images can have similar intensity distributions, deep learning image registration can be accurately applied to such outputted modality-neutral versions. That is, the computerized tool described herein can enable deep learning image registration to be accurately applied to multi-modal images, whereas existing techniques could not enable deep learning image registration to be accurately applied to multi-modal images. Such a computerized tool constitutes a concrete and tangible technical improvement in the field of image registration, and thus certainly qualifies as a useful and practical application of computers.

Furthermore, various embodiments of the subject innovation can control real-world tangible devices based on the disclosed teachings. For example, various embodiments of the subject innovation can electronically receive real-world medical images (e.g., real-world X-ray images, real-world CT images), can electronically execute a real-world neural network on such real-world medical images to yield modality-neutral versions of those real-world medical images, and can facilitate deep learning image registration on such real-world medical images based on the modality-neutral versions.

It should be appreciated that the herein figures and description provide non-limiting examples of the subject innovation and are not necessarily drawn to scale.

FIG. 1 illustrates a block diagram of an example, non-limiting system 100 that can facilitate multi-modal image registration via modality-neutral machine learning transformation in accordance with one or more embodiments described herein. As shown, a modality-neutral image registration system 102 can be electronically integrated, via any suitable wired and/or wireless electronic connections, with a movable image 104 and/or a fixed image 106.

In various embodiments, the movable image 104 can be any suitable medical image that depicts any suitable anatomical structures and/or portions thereof of a patient. In various aspects, the movable image 104 can have any suitable dimensionality. For example, in some cases, the movable image 104 can be a two-dimensional pixel array having any suitable number and/or arrangement of pixels (e.g., the movable image 104 can be an s-by-t array of pixels, for any suitable positive integers s and t). As another example, in other cases, the movable image 104 can be a three-dimensional voxel array having any suitable number and/or arrangement of voxels (e.g., the movable image 104 can be an s-by-t-by-u array of voxels, for any suitable positive integers s, t, and u). Moreover, in various instances, the movable image 104 can be generated by, captured by, and/or otherwise associated with any suitable first imaging modality. As some non-limiting examples, the first imaging modality can be an X-ray imaging modality (e.g., the movable image 104 can be an X-ray scan of the patient), a CT imaging modality (e.g., the movable image 104 can be a CT scan of the patient), an MRI imaging modality (e.g., the movable image 104 can be an MRI scan of the patient), an ultrasound imaging modality (e.g., the movable image 104 can be an ultrasound scan of the patient), and/or a PET imaging modality (e.g., the movable image 104 can be a PET scan of the patient).

In various embodiments, the fixed image 106 can be any suitable medical image that corresponds to the movable image 104. In various aspects, the fixed image 106 can have the same dimensionality as the movable image 104 (e.g., if the movable image 104 is an s-by-t pixel array, then the fixed image 106 can likewise be an s-by-t pixel array; if the movable image 104 is an s-by-t-by-u voxel array, then the fixed image 106 can likewise be an s-by-t-by-u voxel array). Furthermore, in various instances, the fixed image 106 can depict the same anatomical structures and/or portions thereof of the same patient as are depicted in the movable image 104. However, in various cases, the anatomical structures and/or portions thereof of the same patient that are depicted in the fixed image 106 can have different orientations and/or different positions as compared to the anatomical structures and/or portions thereof of the same patient that are depicted in the movable image 104. Moreover, in various aspects, the fixed image 106 can be generated by, captured by, and/or otherwise associated with any suitable second imaging modality that is different from the first imaging modality. As a non-limiting example, if the first imaging modality is a CT imaging modality, then the second imaging modality can be not a CT imaging modality; instead, the second imaging modality can be an X-ray imaging modality, an MRI imaging modality, an ultrasound imaging modality, and/or a PET imaging modality. As another non-limiting example, if the first imaging modality is an MRI imaging modality, then the second imaging modality can be not an MRI imaging modality; instead, the second imaging modality can be an X-ray imaging modality, a CT imaging modality, an ultrasound imaging modality, and/or a PET imaging modality.

In any case, it can be desired to register the movable image 104 with the fixed image 106. In other words, it can be desired to shift and/or translate the pixels/voxels of the movable image 104, such that the features (e.g., anatomical structures and/or portions thereof) depicted in the movable image 104 become aligned with the features depicted in the fixed image 106 (e.g., the movable image 104 can be the image whose pixels/voxels are shifted, whereas the fixed image 106 can be the image whose pixels/voxels are not shifted). In various instances, the modality-neutral image registration system 102 can facilitate such registration, as described herein.

In various embodiments, the modality-neutral image registration system 102 can comprise a processor 108 (e.g., computer processing unit, microprocessor) and a computer-readable memory 110 that is operably and/or operatively and/or communicatively connected/coupled to the processor 108. The computer-readable memory 110 can store computer-executable instructions which, upon execution by the processor 108, can cause the processor 108 and/or other components of the modality-neutral image registration system 102 (e.g., receiver component 112, modality-neutral component 114, field component 116, execution component 118) to perform one or more acts. In various embodiments, the computer-readable memory 110 can store computer-executable components (e.g., receiver component 112, modality-neutral component 114, field component 116, execution component 118), and the processor 108 can execute the computer-executable components.

In various embodiments, the modality-neutral image registration system 102 can comprise a receiver component 112. In various aspects, the receiver component 112 can electronically receive and/or otherwise electronically access the movable image 104 and/or the fixed image 106. In various instances, the receiver component 112 can electronically retrieve the movable image 104 and/or the fixed image 106 from any suitable centralized and/or decentralized data structure (not shown). In various other instances, the receiver component 112 can electronically retrieve the movable image 104 and/or the fixed image 106 from any suitable imaging devices (e.g., X-ray scanners, CT scanners, MRI scanners, ultrasound scanners, PET scanners) that captured and/or otherwise generated the movable image 104 and/or the fixed image 106. In any case, the receiver component 112 can electronically obtain and/or access the movable image 104 and/or the fixed image 106, such that other components of the modality-neutral image registration system 102 can electronically interact with the movable image 104 and/or the fixed image 106.

In various embodiments, the modality-neutral image registration system 102 can comprise a modality-neutral component 114. In various aspects, as described herein, the modality-neutral component 114 can electronically execute a machine learning model on the movable image 104 and/or the fixed image 106, so as to generate a modality-neutral version of the movable image 104 and/or a modality-neutral version of the fixed image 106.

In various embodiments, the modality-neutral image registration system 102 can comprise a field component 116. In various instances, as described herein, the field component 116 can electronically generate a registration field based on the modality-neutral version of the movable image 104 and/or the modality-neutral version of the fixed image 106, where the registration field can be considered as a vector field indicating how pixels/voxels of the modality-neutral version of the movable image 104 should be shifted so as to become aligned with the modality-neutral version of the fixed image 106. In some cases, the field component 116 can generate the registration field analytically and/or via deep learning image registration.

In various embodiments, the modality-neutral image registration system 102 can comprise an execution component 118. In various aspects, as described herein, the execution component 118 can electronically generate a registered image based on the registration field. In various cases, the registered image can be considered as a transformed version of the movable image 104, where such transformed version is in alignment with the fixed image 106.

Figure 2:
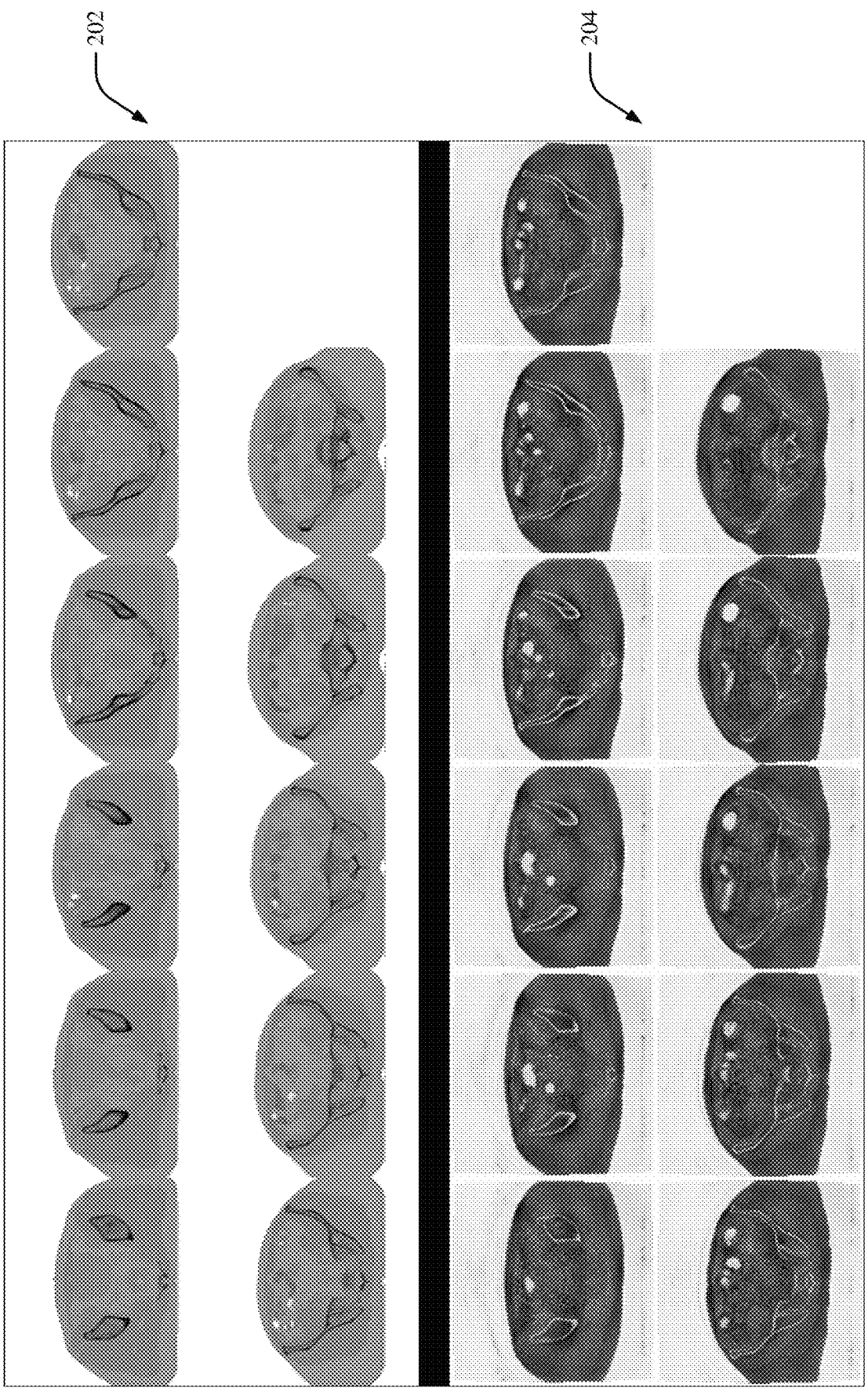
FIG. 2 illustrates non-limiting examples of a movable image and a fixed image that are captured/generated via different imaging modalities in accordance with one or more embodiments described herein.

FIG. 2 illustrates non-limiting examples of a movable image and a fixed image that are captured/generated via different imaging modalities in accordance with one or more embodiments described herein. In other words, FIG. 2 shows non-limiting example embodiments of the movable image 104 and the fixed image 106.

As shown, FIG. 2 includes a CT voxel array 202 and an MRI voxel array 204. For purposes of illustration, the CT voxel array 202 is depicted as a series of two-dimensional pixel arrays (e.g., eleven pixel arrays in this non-limiting example), where such pixel arrays can be considered as cross-sectional slices which, when stacked upon each other, collectively form the CT voxel array 202. Similarly, for purposes of illustration, the MRI voxel array 204 is depicted as a series of two-dimensional pixel arrays (e.g., eleven pixel arrays in this non-limiting example), where such pixel arrays can be considered as cross-sectional slices which, when stacked upon each other, collectively form the MRI voxel array 204.

As shown, both the CT voxel array 202 and the MRI voxel array 204 can depict the pelvic region of a patient. That is, the pelvic region depicted in the CT voxel array 202 belongs to the same patient as that depicted in the MRI voxel array 204. Because the CT voxel array 202 can have been generated and/or captured by a CT scanner, and because the MRI voxel array 204 can have been generated and/or captured by an MRI scanner, the CT voxel array 202 and the MRI voxel array 204 can be considered as multi-modal images (e.g., can be considered as coming from different imaging modalities). In various cases, the CT voxel array 202 can be considered as a non-limiting example of the movable image 104, and the MRI voxel array 204 can be considered as a non-limiting example of the fixed image 106.

As can be visually seen in FIG. 2, the CT voxel array 202 has a significantly different intensity distribution than the MRI voxel array 204. In particular, the CT voxel array 202 has many more pixels/voxels that have low and/or dark intensity values, whereas the MRI voxel array 204 has many more pixels/voxels that have high and/or light intensity values. Such discrepancy between pixel/voxel intensity distributions can be due to the fact that the CT voxel array 202 and the MRI voxel array 204 are associated with different imaging modalities (e.g., since the CT voxel array 202 and the MRI voxel array 204 come from different imaging modalities, they have significantly differing intensity distributions). This is shown more clearly with respect to FIG. 3.

Figure 3:
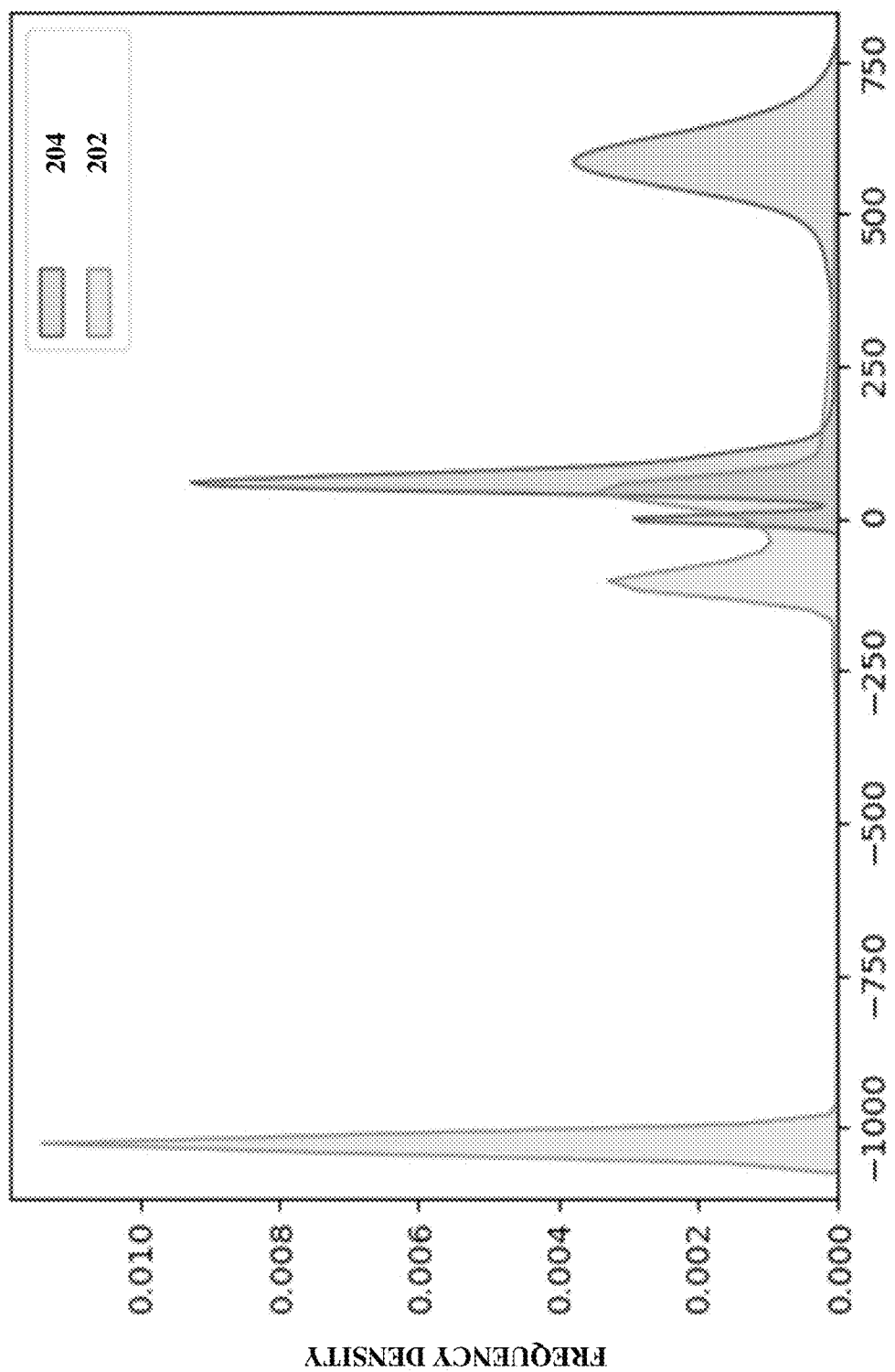
FIG. 3 illustrates example, non-limiting intensity distributions of a movable image and a fixed image that are captured/generated via different imaging modalities in accordance with one or more embodiments described herein.

FIG. 3 illustrates example, non-limiting intensity distributions of a movable image and a fixed image that are captured/generated via different imaging modalities in accordance with one or more embodiments described herein.

More specifically, FIG. 3 depicts a graph 300 that shows the frequency distribution of pixel/voxel intensity values of the CT voxel array 202, and that also shows the frequency distribution of pixel/voxel intensity values of the MRI voxel array 204. In particular, the pixel/voxel intensity distribution of the CT voxel array 202 is demarcated as orange in the graph 300, and the pixel/voxel intensity distribution of the MRI voxel array 204 is demarcated as blue in the graph 300. As can be seen, the pixel/voxel intensity distribution of the CT voxel array 202 is significantly different from that of the MRI voxel array 204. Indeed, the CT voxel array 202 has a much higher proportion of low-intensity pixel/voxel values and a much lower proportion of high-intensity pixel/voxel values. In contrast, the MRI voxel array 204 has a much higher proportion of high-intensity pixel/voxel values and a much lower proportion of low-intensity pixel/voxel values. This helps to explain why the CT voxel array 202 visually appears to be much darker than the MRI voxel array 204. Indeed, as those having ordinary skill in the art will appreciate, a CT scanner represents soft tissue via dark and/or low intensity values and represents bone tissue via light and/or high intensity values; on the other hand, an MRI scanner represents bone tissue via dark and/or low intensity values and represents soft tissue via light and/or high intensity values. Accordingly, since the pelvic region of the patient is mostly soft tissue rather than bone, the CT voxel array 202 visually appears to be darker while the MRI voxel array 204 visually appears to be lighter. In any case, the graph 300 shows that intensity distributions of the CT voxel array 202 and the MRI voxel array 204 can be significantly different, and such significant difference is due to the fact that they are multi-modal images (e.g., they are not generated by the same imaging modality).

Furthermore, as mentioned above, such significant difference in intensity distributions is what prevents deep learning image registration from being accurately applied to multi-modal images (e.g., is what makes multi-modal image registration more difficult and/or complex for deep learning techniques). Again, when existing techniques are implemented, not only would a deep learning image registration model have to learn how to handle depicted structure/feature mismatches between a pair of multi-modal images, but the deep learning image registration model would also have to learn how to handle the significant difference in intensity distributions between a pair of multi-modal images. As explained above, a deep learning image registration model that is trained on a mono-modal dataset cannot handle the latter task, and a deep learning image registration model cannot be easily and/or practicably trained on a multi-modal dataset. Accordingly, when existing techniques are used, deep learning image registration simply cannot be accurately applied to multi-modal images. As explained herein, however, the modality-neutral image registration system 102 can address these shortcomings of existing techniques.

Figure 4:
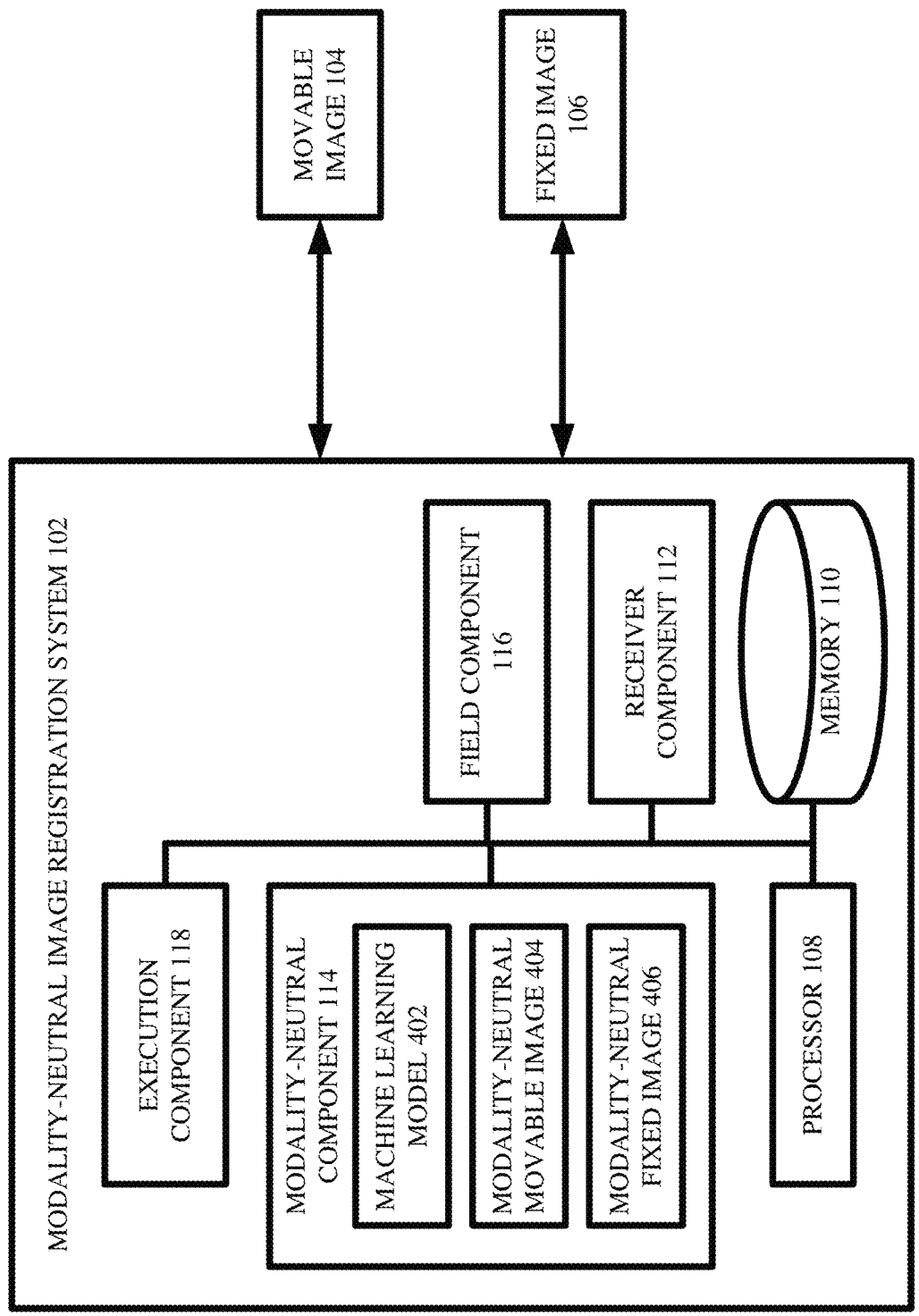
FIG. 4 illustrates a block diagram of an example, non-limiting system including a machine learning model, a modality-neutral movable image, and a modality-neutral fixed image that facilitates multi-modal image registration via modality-neutral machine learning transformation in accordance with one or more embodiments described herein.

FIG. 4 illustrates a block diagram of an example, non-limiting system 400 including a machine learning model, a modality-neutral movable image, and a modality-neutral fixed image that can facilitate multi-modal image registration via modality-neutral machine learning transformation in accordance with one or more embodiments described herein. As shown, the system 400 can, in some cases, comprise the same components as the system 100, and can further comprise a machine learning model 402, a modality-neutral movable image 404, and/or a modality-neutral fixed image 406.

In various aspects, the modality-neutral component 114 can electronically store, electronically maintain, electronically control, and/or otherwise electronically access the machine learning model 402. In various instances, the modality-neutral component 114 can electronically execute the machine learning model 402 on both the movable image 104 and the fixed image 106, thereby yielding the modality-neutral movable image 404 and the modality-neutral fixed image 406. This is further explained with respect to FIG. 5.

Figure 5:
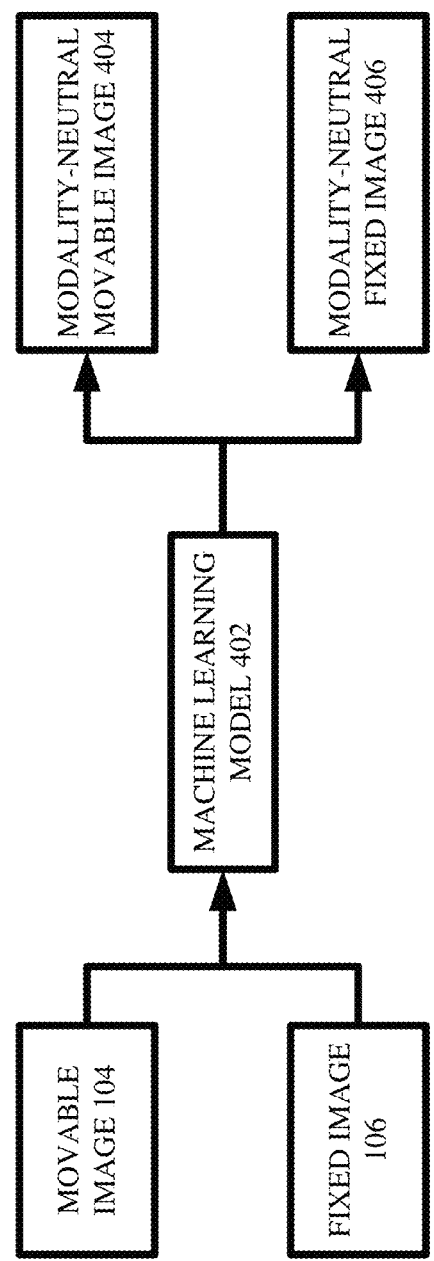
FIG. 5 illustrates an example, non-limiting block diagram showing how a machine learning model can generate modality-neutral versions of inputted images in accordance with one or more embodiments described herein.

FIG. 5 illustrates an example, non-limiting block diagram 500 showing how the machine learning model 402 can generate the modality-neutral movable image 404 and the modality-neutral fixed image 406 in accordance with one or more embodiments described herein.

In various aspects, the machine learning model 402 can have any suitable artificial intelligence architecture as desired. For example, the machine learning model 402 can be a deep learning neural network that has any suitable number of layers, any suitable numbers of neurons in various layers, any suitable activation functions in various neurons, and/or any suitable interneuron connectivity patterns. In various instances, the machine learning model 402 can be configured to receive as input both the movable image 104 and the fixed image 106, and to produce as output both the modality-neutral movable image 404 and the modality-neutral fixed image 406. More specifically, the movable image 104 and the fixed image 106 can be concatenated together, an input layer of the machine learning model 402 can receive such concatenation, such concatenation can complete a forward pass through one or more hidden layers of the machine learning model 402, and an output layer of the machine learning model 402 can compute both the modality-neutral movable image 404 and the modality-neutral fixed image 406 based on activations provided by the one or more hidden layers.

In various aspects, the modality-neutral movable image 404 can correspond to the movable image 104. For instance, in various cases, the modality-neutral movable image 404 can have the same dimensionality as the movable image 104. For example, if the movable image 104 is an s-by-t array of pixels for any suitable positive integers s and t, then the modality-neutral movable image 404 can likewise be an s-by-t array of pixels. As another example, if the movable image 104 is an s-by-t-by-u array of voxels for any suitable positive integers s, t, and u, then the modality-neutral movable image 404 can likewise be an s-by-t-by-u array of voxels. Moreover, in various aspects, the modality-neutral movable image 404 can depict the same anatomical structures and/or portions thereof in the same orientations and/or positions as the movable image 104. That is, the movable image 104 can depict one or more anatomical structures in one or more given orientations/positions, and the modality-neutral movable image 404 can depict the same one or more anatomical structures in the same one or more given orientations/positions. However, in various instances, the modality-neutral movable image 404 can exhibit a different pixel/voxel intensity distribution than the movable image 104. In other words, the modality-neutral movable image 404 can be considered as conveying the same visual content (e.g., showing the same depicted features and/or structures with the same depicted orientations and/or positions) as the movable image 104, but via different pixel/voxel intensity values than the movable image 104.

In various aspects, the modality-neutral fixed image 406 can correspond to the fixed image 106. For instance, in various cases, the modality-neutral fixed image 406 can have the same dimensionality as the fixed image 106. For example, if the fixed image 106 is an s-by-t array of pixels for any suitable positive integers s and t, then the modality-neutral fixed image 406 can likewise be an s-by-t array of pixels. As another example, if the fixed image 106 is an s-by-t-by-u array of voxels for any suitable positive integers s, t, and u, then the modality-neutral fixed image 406 can likewise be an s-by-t-by-u array of voxels. Moreover, in various aspects, the modality-neutral fixed image 406 can depict the same anatomical structures and/or portions thereof in the same orientations and/or positions as the fixed image 106. That is, the fixed image 106 can depict one or more anatomical structures in one or more particular orientations/positions, and the modality-neutral fixed image 406 can depict the same one or more anatomical structures in the same one or more particular orientations/positions. However, in various instances, the modality-neutral fixed image 406 can exhibit a different pixel/voxel intensity distribution than the fixed image 106. That is, the modality-neutral fixed image 406 can be considered as conveying the same visual content (e.g., showing the same depicted features and/or structures with the same depicted orientations and/or positions) as the fixed image 106, but via different pixel/voxel intensity values than the fixed image 106.

As mentioned above and as shown at least with respect to FIGS. 2-3, the movable image 104 and the fixed image 106 can have significantly different pixel/voxel intensity distributions as each other. Again, this can be due to the fact that the movable image 104 and the fixed image 106 are multi-modal images (e.g., are generated/captured by different imaging modalities and/or different types of imaging devices). In stark contrast, however, the modality-neutral movable image 404 and the modality-neutral fixed image 406 can have significantly similar pixel/voxel intensity distributions as each other. In other words, the machine learning model 402 can be considered as converting, changing, and/or transforming the pixel/voxel intensity distributions of the movable image 104 and the fixed image 106, such that the converted, changed, and/or transformed pixel/voxel intensity distributions are not significantly different (e.g., are within any suitable threshold margin of each other). In still other words, the machine learning model 402 can be considered as generating new versions of the movable image 104 and the fixed image 106, which new versions have reconciled intensity distributions.

In any case, because the modality-neutral movable image 404 and the modality-neutral fixed image 406 can have similar (e.g., measured as being within any suitable threshold margin) intensity distributions as each other, the modality-neutral movable image 404 and the modality-neutral fixed image 406 can be considered as not being multi-modal images. Instead, the modality-neutral movable image 404 and the modality-neutral fixed image 406 can be considered as being akin to mono-modal images. In other words, because the modality-neutral movable image 404 and the modality-neutral fixed image 406 can have significantly similar intensity distribution, the modality-neutral movable image 404 and the modality-neutral fixed image 406 can visually appear to have been generated/captured by the same type of imaging modality. In still other words, since multi-modal images manifest as having significantly different intensity distributions, since mono-modal images manifest as having significantly similar intensity distributions, and since the modality-neutral movable image 404 and the modality-neutral fixed image 406 can exhibit significantly similar intensity distributions as each other, the modality-neutral movable image 404 and the modality-neutral fixed image 406 can be considered as being more like mono-modal images and less like multi-modal images. This is explained more with respect to FIGS. 6-7.

Figure 6:
FIG. 6 illustrates non-limiting examples of a modality-neutral movable image and a modality-neutral fixed image in accordance with one or more embodiments described herein.

FIG. 6 illustrates non-limiting examples of a modality-neutral movable image and a modality-neutral fixed image in accordance with one or more embodiments described herein. In other words, FIG. 6 shows non-limiting example embodiments of the modality-neutral movable image 404 and the modality-neutral fixed image 406.

As shown, FIG. 6 includes a modality-neutral voxel array 602 and a modality-neutral voxel array 604. For purposes of illustration, the modality-neutral voxel array 602 is depicted as a series of two-dimensional pixel arrays (e.g., eleven pixel arrays in this non-limiting example), where such pixel arrays can be considered as cross-sectional slices which, when stacked upon each other, collectively form the modality-neutral voxel array 602. Similarly, for purposes of illustration, the modality-neutral voxel array 604 is depicted as a series of two-dimensional pixel arrays (e.g., eleven pixel arrays in this non-limiting example), where such pixel arrays can be considered as cross-sectional slices which, when stacked upon each other, collectively form the modality-neutral voxel array 604.

In various aspects, the modality-neutral voxel array 602 can be considered as a non-limiting example of the modality-neutral movable image 404, and the modality-neutral voxel array 604 can be considered as a non-limiting example of the modality-neutral fixed image 406. More specifically, the modality-neutral voxel array 602 and the modality-neutral voxel array 604 can be considered as the output that is generated by the machine learning model 402, when the machine learning model 402 receives as input the CT voxel array 202 and the MRI voxel array 204. In particular and as shown, the modality-neutral voxel array 602 depicts the same pelvic region in the same orientations/positions as the CT voxel array 202; however, the modality-neutral voxel array 602 exhibits a different intensity distribution than the CT voxel array 202. Note that, despite such different intensity distribution, the same feature content and/or structural detail (e.g., organ edges, tissue regions) that are shown in the CT voxel array 202 are preserved in the modality-neutral voxel array 602. Similarly and as shown, the modality-neutral voxel array 604 depicts the same pelvic region in the same orientations/positions as the MRI voxel array 204; however, the modality-neutral voxel array 604 exhibits a different intensity distribution than the MRI voxel array 204. Again, note that, despite such different intensity distribution, the same feature content and/or structural detail (e.g., organ edges, tissue regions) that are shown in the MRI voxel array 204 are preserved in the modality-neutral voxel array 604.

Furthermore, as can be visually seen in FIG. 6, the modality-neutral voxel array 602 and the modality-neutral voxel array 604 exhibit very similar pixel/voxel intensity distributions as each other. That is, the modality-neutral voxel array 602 and the modality-neutral voxel array 604 have similar proportions of dark/low intensity values and light/high intensity values. This is in stark contrast to the CT voxel array 202 and the MRI voxel array 204, which have significantly different intensity distributions. For more explanation, consider FIG. 7.

Figure 7:
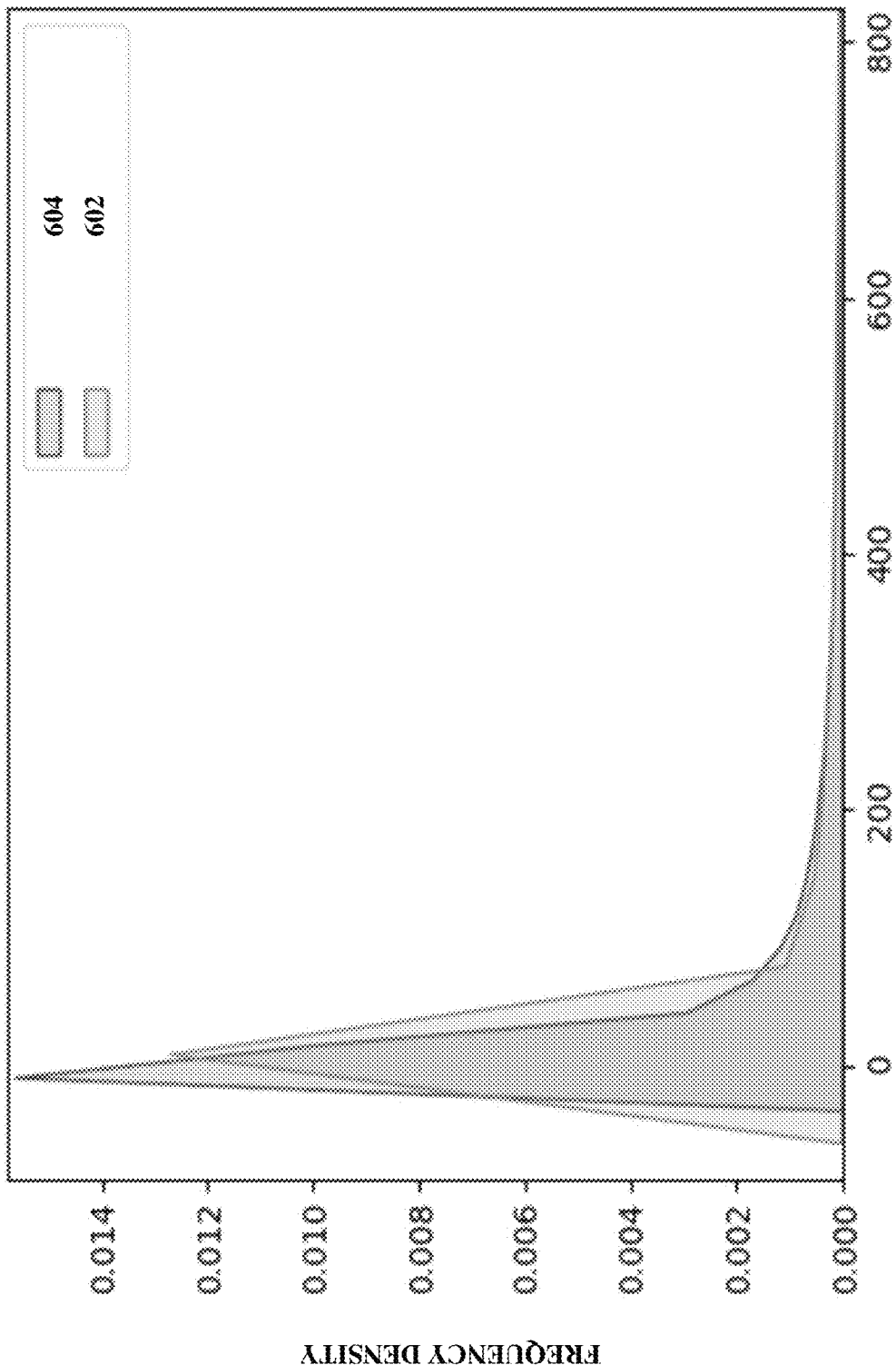
FIG. 7 illustrates example, non-limiting intensity distributions of a modality-neutral movable image and a modality-neutral fixed image in accordance with one or more embodiments described herein.

FIG. 7 illustrates example, non-limiting intensity distributions of a modality-neutral movable image and a modality-neutral fixed image in accordance with one or more embodiments described herein.

More specifically, FIG. 7 depicts a graph 700 that shows the frequency distribution of pixel/voxel intensity values of the modality-neutral voxel array 602, and that also shows the frequency distribution of pixel/voxel intensity values of the modality-neutral voxel array 604. In particular, the pixel/voxel intensity distribution of the modality-neutral voxel array 602 is demarcated as orange in the graph 700, and the pixel/voxel intensity distribution of the modality-neutral voxel array 604 is demarcated as blue in the graph 700. As can be seen, the pixel/voxel intensity distribution of the modality-neutral voxel array 602 is very similar to that of the modality-neutral voxel array 604. Indeed, both the modality-neutral voxel array 602 and the modality-neutral voxel array 604 have similarly-sized and similarly-shaped peaks around the "0" Hounsfield unit mark. This helps to explain why the modality-neutral voxel array 602 visually appears to be similar in terms of shading and/or darkness as compared to the modality-neutral voxel array 604.

Further still, because the intensity distribution of the modality-neutral voxel array 602 is very similar to that of the modality-neutral voxel array 604, it is as if the modality-neutral voxel array 602 and the modality-neutral voxel array 604 are not multi-modal images. Instead, it is as if the modality-neutral voxel array 602 and the modality-neutral voxel array 604 are mono-modal images (e.g., as if the modality-neutral voxel array 602 and the modality-neutral voxel array 604 were generated by the same type of imaging modality). Accordingly, the machine learning model 402 can, in some cases, be considered generating transformed versions of the CT voxel array 202 and the MRI voxel array 204 (e.g., the modality-neutral voxel array 602 can be the transformed version of the CT voxel array 202, and the modality-neutral voxel array 604 can be the transformed version of the MRI voxel array 204), where such transformed versions have reconciled and/or similar intensity distributions. More generally, when given an inputted pair of multi-modal images, the machine learning model 402 can output versions of the inputted pair of multi-modal images, where such outputted versions can visually appear to have been created/generated by the same type of imaging modality as each other rather than by different types of imaging modalities (e.g., can visually appear to be mono-modal images rather than multi-modal images).

Those having ordinary skill in the art will appreciate that the modality-neutral voxel array 602 and the modality-neutral voxel array 604 are not simply the result of mere edge detection (e.g., the machine learning model 402 is not trained to perform mere edge detection). After all, mere edge detection cannot be accurately applied to multi-modal images, due to the significant disparity between intensity distributions that is characteristic of multi-modal images. More specifically, one type of imaging modality can represent certain edges with dark/low intensity values, whereas a different type of imaging modality can represent corresponding edges with light/high intensity values. Mere edge detection cannot be successfully used in the presence of such disparate edge representations (e.g., cannot be successfully used in the presence of such differing intensity distributions).

Figure 8:
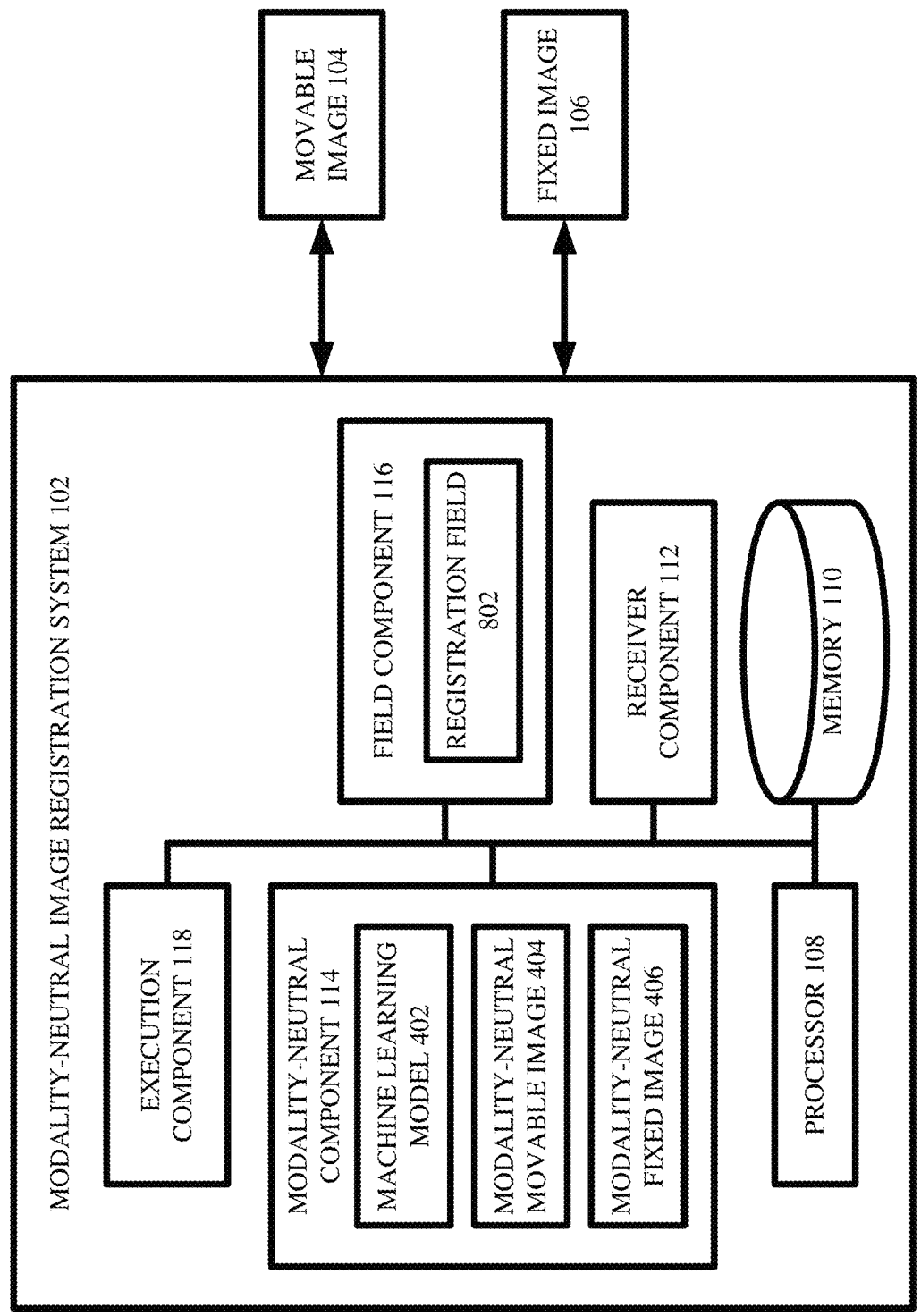
FIG. 8 illustrates a block diagram of an example, non-limiting system including a registration field that facilitates multi-modal image registration via modality-neutral machine learning transformation in accordance with one or more embodiments described herein.

FIG. 8 illustrates a block diagram of an example, non-limiting system 800 including a registration field that can facilitate multi-modal image registration via modality-neutral machine learning transformation in accordance with one or more embodiments described herein. As shown, the system 800 can, in some cases, comprise the same components as the system 400, and can further comprise a registration field 802.

In various embodiments, the field component 116 can electronically generate the registration field 802, based on the modality-neutral movable image 404 and the modality-neutral fixed image 406. In various aspects, the registration field 802 can be a vector field that indicates pixel-wise and/or voxel-wise shift vectors which, when applied to the modality-neutral movable image 404, cause the modality-neutral movable image 404 to become aligned and/or registered with the modality-neutral fixed image 406. For example, if the modality-neutral movable image 404 is an s-by-t pixel array for any suitable positive integers s and t, then the registration field 802 can be an s-by-t matrix, where each element of such matrix is a vector (e.g., as opposed to a scalar) indicating a direction in which and/or a magnitude by which a respectively corresponding pixel of the modality-neutral movable image 404 should be shifted and/or translated, so as to facilitate registration with the modality-neutral fixed image 406. As another example, if the modality-neutral movable image 404 is an s-by-t-by-u voxel array for any suitable positive integers s, t, and u, then the registration field 802 can be an s-by-t-by-u tensor, where each element of such tensor is a vector (e.g., as opposed to a scalar) indicating a direction in which and/or a magnitude by which a respectively corresponding voxel of the modality-neutral movable image 404 should be shifted and/or translated, so as to facilitate registration with the modality-neutral fixed image 406. In any case, the field component 116 can electronically generate the registration field 802 via any suitable techniques. This is explained more with respect to FIG. 9.

Figure 9:
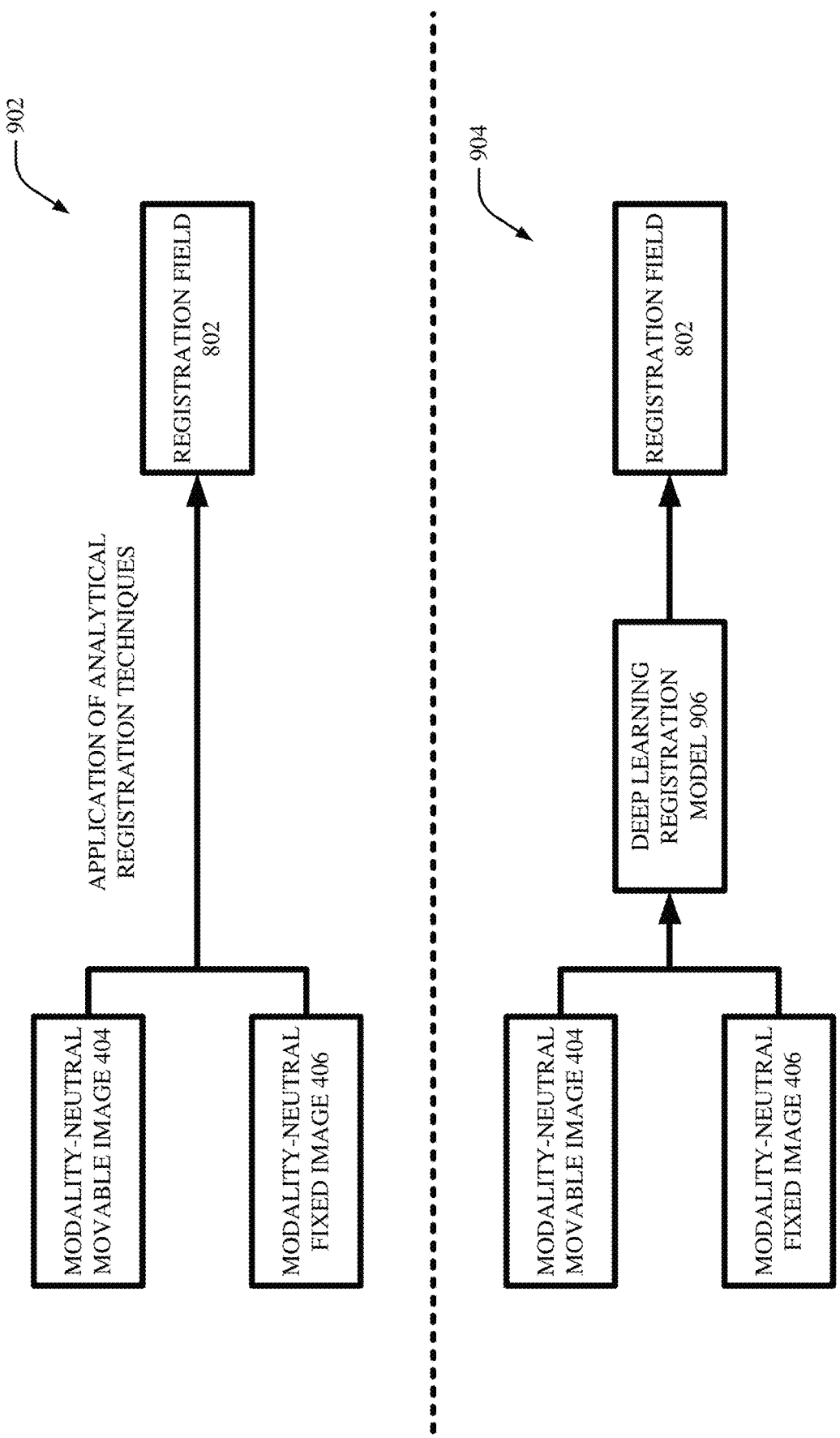
FIG. 9 illustrates an example, non-limiting block diagram showing how a registration field can be generated based on a modality-neutral movable image and a modality-neutral fixed image in accordance with one or more embodiments described herein.

FIG. 9 illustrates an example, non-limiting block diagram showing how the registration field 802 can be generated based on the modality-neutral movable image 404 and the modality-neutral fixed image 406 in accordance with one or more embodiments described herein. As shown, FIG. 9 includes two scenarios: a scenario 902 and a scenario 904.

In the scenario 902, the field component 116 can electronically generate the registration field 802 by applying any suitable analytical image registration techniques to the modality-neutral movable image 404 and/or to the modality-neutral fixed image 406. As those having ordinary skill in the art will appreciate, there exist various analytical techniques by which a registration field can be derived when given a pair of images, and thus any of such analytical techniques can be implemented by the field component 116.

In the scenario 904, on the other hand, the field component 116 can electronically store, electronically maintain, electronically control, and/or otherwise electronically access a deep learning registration model 906. In various aspects, the deep learning registration model 906 can exhibit a neural network architecture. For example, the deep learning registration model 906 can have any suitable number of layers, any suitable numbers of neurons in various layers, any suitable activation functions in various neurons, and/or any suitable interneuron connectivity patterns. In any case, the deep learning registration model 906 can be configured to receive as input both the modality-neutral movable image 404 and the modality-neutral fixed image 406, and to produce as output the registration field 802. More specifically, the modality-neutral movable image 404 and the modality-neutral fixed image 406 can be concatenated together, an input layer of the deep learning registration model 906 can receive such concatenation, such concatenation can complete a forward pass through one or more hidden layers of the deep learning registration model 906, and an output layer of the deep learning registration model 906 can compute the registration field 802 based on activations provided by the one or more hidden layers. Accordingly, the field component 116 can, in various aspects, execute the deep learning registration model 906 on the modality-neutral movable image 404 and the modality-neutral fixed image 406, thereby yielding the registration field 802.

As those having ordinary skill in the art will appreciate, the deep learning registration model 906 can be trained in any suitable fashion (e.g., supervised training, unsupervised training, reinforcement learning) to accurately infer registration fields from inputted pairs of images.

For example, there can be an annotated training dataset that includes a set of training image pairs and a set of annotations that respectively correspond to the set of training image pairs. In various cases, the set of training image pairs can include n pairs of images, for any suitable positive integer n, and the set of annotations can likewise include n annotations (e.g., one annotation per training image pair). In various instances, each training image pair can include a training movable image and a training fixed image, where the training movable image and the training fixed image can be multi-modal (e.g., can be generated and/or captured via different imaging modalities). In various aspects, each annotation can be a ground-truth registration field that is known to correspond to a respective training image pair (e.g., that is known to transform a corresponding training movable image into a corresponding training fixed image). In various cases, the internal parameters (e.g., weights, biases) of the deep learning registration model 906 can be randomly initialized, and the deep learning registration model 906 can be trained in supervised fashion on the annotated training dataset.

For instance, a training image pair and a corresponding annotation can be selected from the annotated training dataset. In various cases, the deep learning registration model 906 can be executed on the selected training image pair, thereby causing the deep learning registration model 906 to produce some output. More specifically, the selected training image pair can be fed to an input layer of the deep learning registration model 906, the selected training image pair can complete a forward pass through one or more hidden layers of the deep learning registration model 906, and an output layer of the deep learning registration model 906 can compute the output based on activations provided by the one or more hidden layers. In various cases, the output can be considered as representing the registration field which the deep learning registration model 906 believes should correspond to the selected training image pair, whereas the selected annotation can be considered as representing the ground-truth registration field that is known to correspond to the selected training image pair. Note that, if the deep learning registration model 906 has so far undergone no and/or little training, then the output can be highly inaccurate (e.g., can be very different from the selected annotation). In any case, an error and/or loss can be computed between the output and the selected annotation, and the internal parameters of the deep learning registration model 906 can be updated via backpropagation that is driven by the error and/or loss. This training procedure can be repeated for each of the training image pairs in the annotated training dataset, with the ultimate result being that the internal parameters of the deep learning registration model 906 can become iteratively optimized for accurately inferring registration fields from inputted image pairs. As those having ordinary skill in the art will appreciate, any suitable training batch sizes, any suitable training termination criteria, and/or any suitable error, loss, and/or objective function can be implemented.

As another example, there can be an unannotated training dataset that includes a set of training image pairs. In various cases, the set of training image pairs can include n pairs of images, for any suitable positive integer n. In various instances, each training image pair can include a training movable image and a training fixed image, where the training movable image and the training fixed image can be multi-modal (e.g., can be generated and/or captured via different imaging modalities). In various cases, the internal parameters (e.g., weights, biases) of the deep learning registration model 906 can be randomly initialized, and the deep learning registration model 906 can be trained in unsupervised fashion on the unannotated training dataset.

For instance, a training image pair can be selected from the unannotated training dataset, where the training image pair includes a training movable image and a training fixed image. In various cases, the deep learning registration model 906 can be executed on the selected training image pair, thereby causing the deep learning registration model 906 to produce some output. More specifically, the selected training image pair can be fed to an input layer of the deep learning registration model 906, the selected training image pair can complete a forward pass through one or more hidden layers of the deep learning registration model 906, and an output layer of the deep learning registration model 906 can compute the output based on activations provided by the one or more hidden layers. In various cases, the output can be considered as representing the registration field which the deep learning registration model 906 believes should correspond to the selected training image pair. Accordingly, in various aspects, the output (e.g., the inferred registration field) can be applied to the training movable image. Note that, if the output (e.g., the inferred registration field) were accurate, then the training movable image would, after transformation, be very similar to the training fixed image. So, if the training movable image is, after transformation, not very similar to (e.g., not properly aligned/registered with) the training fixed image, it can be determined that the output was not accurate. Thus, in any case, an error and/or loss can be computed between the transformed training movable image and the training fixed image, and the internal parameters of the deep learning registration model 906 can be updated via backpropagation that is driven by the error and/or loss. This training procedure can be repeated for each of the training image pairs in the unannotated training dataset, with the ultimate result being that the internal parameters of the deep learning registration model 906 can become iteratively optimized for accurately inferring registration fields from inputted image pairs. As those having ordinary skill in the art will appreciate, any suitable training batch sizes, any suitable training termination criteria, and/or any suitable error, loss, and/or objective function can be implemented.

As those having ordinary skill in the art will appreciate, the scenario 904 can be considered as illustrating deep learning image registration. As explained thoroughly above, deep learning image registration cannot be accurately applied to the movable image 104 and the fixed image 106, since the movable image 104 and the fixed image 106 have significantly different intensity distributions (e.g., are multi-modal images). However, as FIG. 9 and the above discussion show, deep learning image registration can be accurately applied to the modality-neutral movable image 404 and the modality-neutral fixed image 406, since the modality-neutral movable image 404 and the modality-neutral fixed image 406 have similar, not different, intensity distributions. In other words, from the perspective of the deep learning registration model 906, the modality-neutral movable image 404 and the modality-neutral fixed image 406 can be considered as mono-modal images since they have similar intensity distributions. This is notwithstanding that the movable image 104 and the fixed image 106 are actually multimodal images. In still other words, the deep learning registration model 906 can be executed on the modality-neutral movable image 404 and on the modality-neutral fixed image 406 without difficulty, because the deep learning registration model 906 is being tasked only with handling depicted feature misalignments; the deep learning registration model 906 is not being tasked with handling intensity distribution mismatches in addition to depicted feature misalignments.

Figure 10:
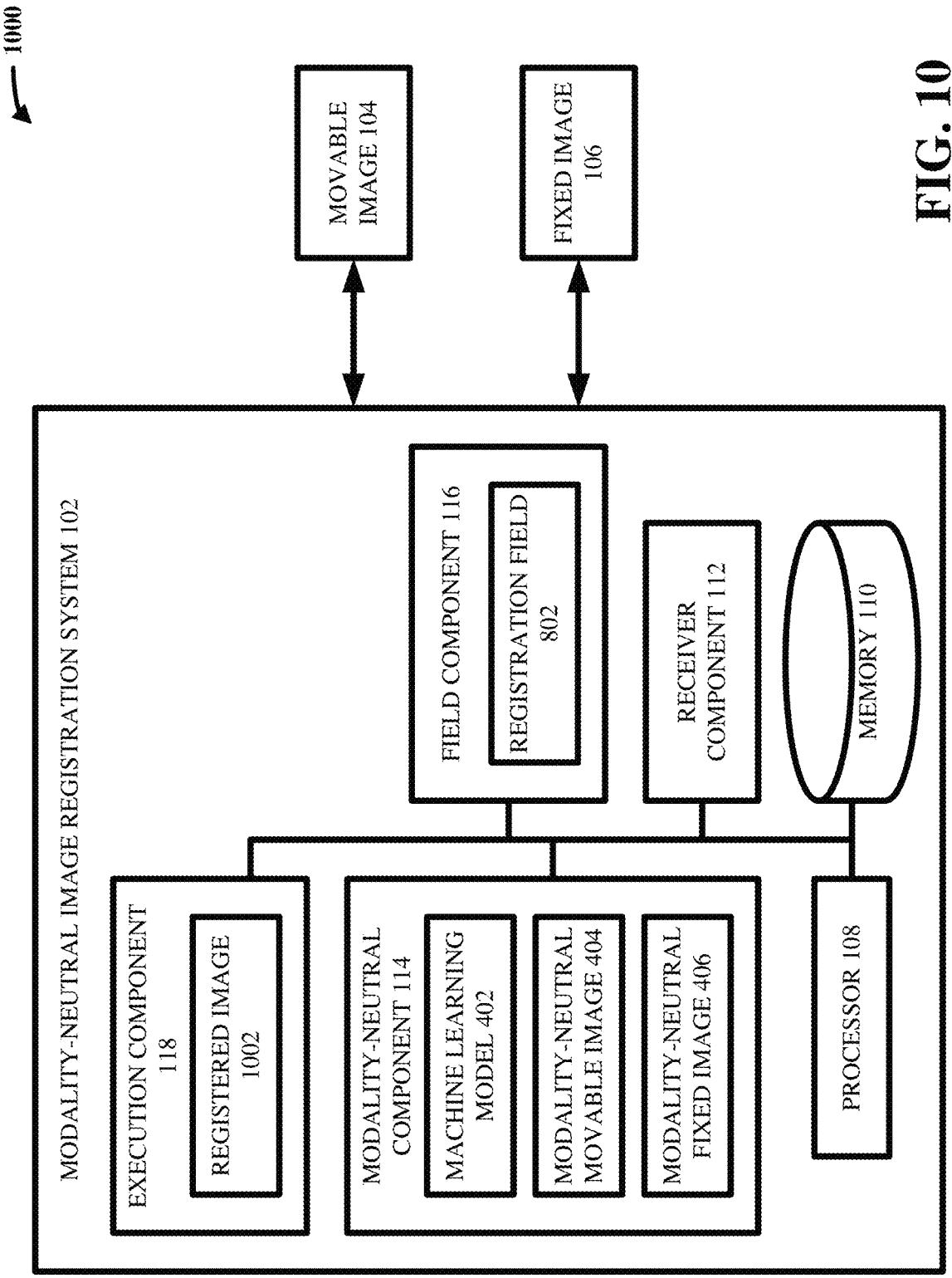
FIG. 10 illustrates a block diagram of an example, non-limiting system including a registered image that facilitates multi-modal image registration via modality-neutral machine learning transformation in accordance with one or more embodiments described herein.

FIG. 10 illustrates a block diagram of an example, non-limiting system 1000 including a registered image that can facilitate multi-modal image registration via modality-neutral machine learning transformation in accordance with one or more embodiments described herein. As shown, the system 1000 can, in some cases, comprise the same components as the system 800, and can further comprise a registered image 1002.

In various embodiments, the execution component 118 can electronically generate the registered image 1002, based on the registration field 802. As mentioned above, the registration field 802 can be a vector field that indicates pixel-wise and/or voxel-wise shift vectors which indicate how respective pixels/voxels of the modality-neutral movable image 404 should be shifted/translated so as to become in alignment with the modality-neutral fixed image 406. In various instances, rather than applying the registration field 802 to the modality-neutral movable image 404, the execution component 118 can apply the registration field 802 to the movable image 104. That is, the execution component 118 can shift and/or translate the pixels/voxels of the movable image 104 in accordance with and/or otherwise as indicated by the registration field 802, and the result of such shifting and/or translating can be the registered image 1002. Thus, the registered image 1002 can be considered as a transformed, shifted, and/or modified version of the movable image 104, where such transformed, shifted, and/or modified version is aligned and/or registered with the fixed image 106. This is shown more with respect to FIG. 11.

Figure 11:
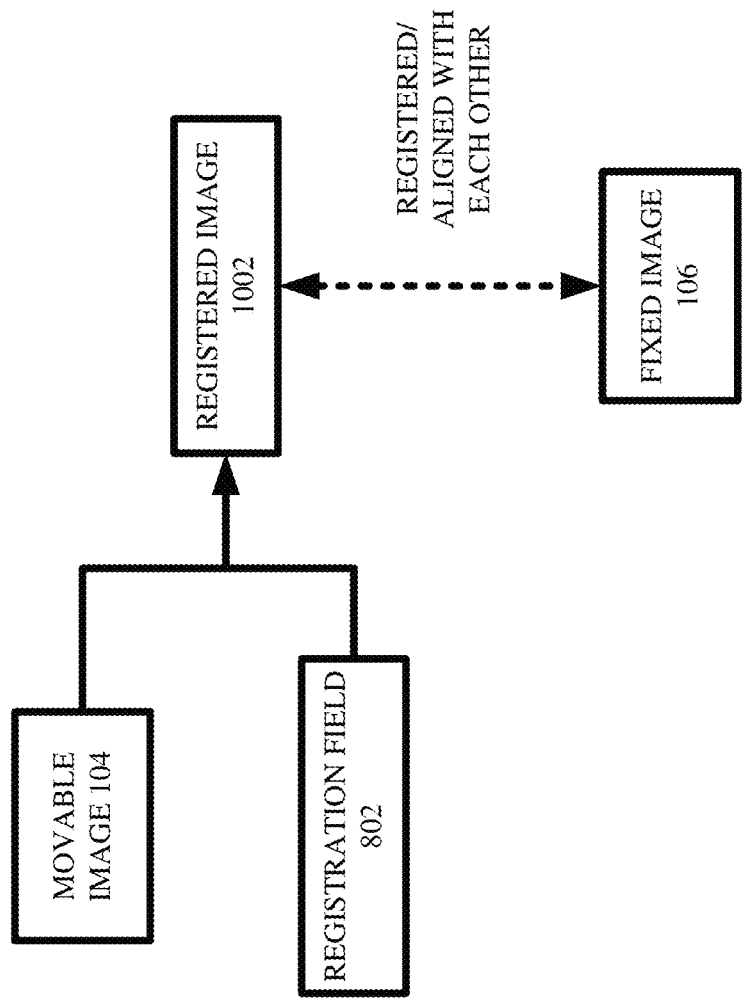
FIG. 11 illustrates an example, non-limiting block diagram showing how a registered image can be generated based on a registration field in accordance with one or more embodiments described herein.

FIG. 11 illustrates an example, non-limiting block diagram 1100 showing how the registered image 1002 can be generated based on the registration field 802 in accordance with one or more embodiments described herein.

As explained above, the registration field 802 can be derived based on the modality-neutral movable image 404 and the modality-neutral fixed image 406. In other words, the registration field 802 can indicate how the pixels/voxels of the modality-neutral movable image 404 should be moved so as to become aligned with the modality-neutral fixed image 406. In various cases, however, the registration field 802 can be not applied to the modality-neutral movable image 404. Instead, the registration field 802 can, in various aspects, be applied to the movable image 104 itself. That is, the pixels/voxels of the movable image 104 can be shifted in accordance with the pixel-wise and/or voxel-wise shift vectors that indicated in the registration field 802, and the registered image 1002 can be considered as the result of such shifting. As experimentally verified by the present inventors, the registered image 1002 can be considered as being in alignment with and/or being registered with the fixed image 106. In other words, the registered image 1002 can be considered as a shifted version of the movable image 104, where the anatomical structures depicted in such shifted version are now in alignment with those depicted in the fixed image 106.

In various cases, the execution component 118 can subsequently take any suitable electronic action with respect to the registered image 1002. For example, the execution component 118 can transmit the registered image 1002 to any suitable computing device (not shown) as desired. As another example, the execution component 118 can render the registered image 1002 on any suitable computer screen and/or display (not shown) as desired.

As explained thoroughly above, existing techniques do not enable deep learning image registration to be accurately applied to multi-modal images. In stark contrast, various embodiments of the modality-neutral image registration system 102 do enable deep learning image registration to be applied to multi-modal images. Specifically, as described herein, the modality-neutral image registration system 102 can convert an inputted pair of multi-modal images (e.g., 104 and 106) into modality-neutral representations (e.g., 404 and 406). Whereas the inputted pair of multi-modal images can have very different intensity distributions than each other, the modality-neutral representations can instead have very similar intensity distributions as each other (e.g., shown in FIGS. 3 and 7). Because the modality-neutral representations can have similar intensity distributions, deep learning image registration can be accurately applied to the modality-neutral representations. Accordingly, the modality-neutral image registration system 102 can generate a registration field (e.g., 802) by applying deep learning image registration (e.g., 906) to the modality-neutral representations, and the modality-neutral image registration system 102 can generate a registered image (e.g., 1002) by applying such registration field to the original inputted pair of multi-modal images. In other words, multi-modal images that are desired to be registered with each other can be considered as exhibiting various characteristics (e.g., significantly differing intensity distributions) that confound deep learning image registration, and the modality-neutral image registration system 102 (e.g., via the machine learning model 402) can be considered as removing such confounding characteristics so as to enable the application of deep learning image registration. This is certainly a concrete and tangible technical improvement.

Figure 12:
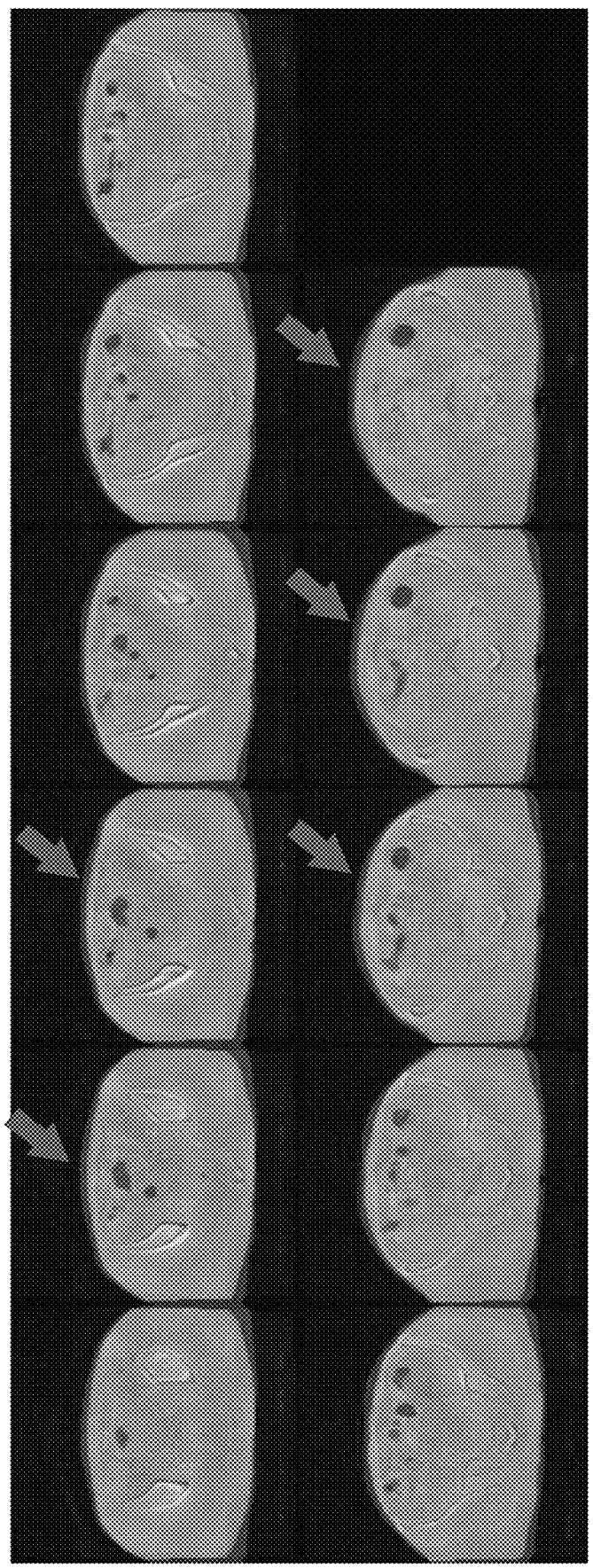
FIG. 12 illustrates an example, non-limiting view of rigidly and non-rigidly registered images that have not undergone modality-neutral machine learning transformation in accordance with one or more embodiments described herein.

FIG. 12 illustrates an example, non-limiting view 1200 of rigidly and non-rigidly registered images that have not undergone modality-neutral machine learning transformation in accordance with one or more embodiments described herein. More specifically, FIG. 12 depicts an overlay of the CT voxel array 202 and the MRI voxel array 204, after existing rigid and non-rigid registration have been performed on the CT voxel array 202 and the MRI voxel array 204. Note that the overlay shown in FIG. 12 was not generated via any embodiment of the subject innovation. As those having ordinary skill in the art will appreciate, application of rigid and non-rigid registration according to existing techniques can yield poorly-aligned structural edges. Specifically, the red arrows of FIG. 12 point out various poorly-aligned boundaries. The present inventors computed a mutual information score of 0.64 for the overlay depicted in FIG. 12.

Figure 13:
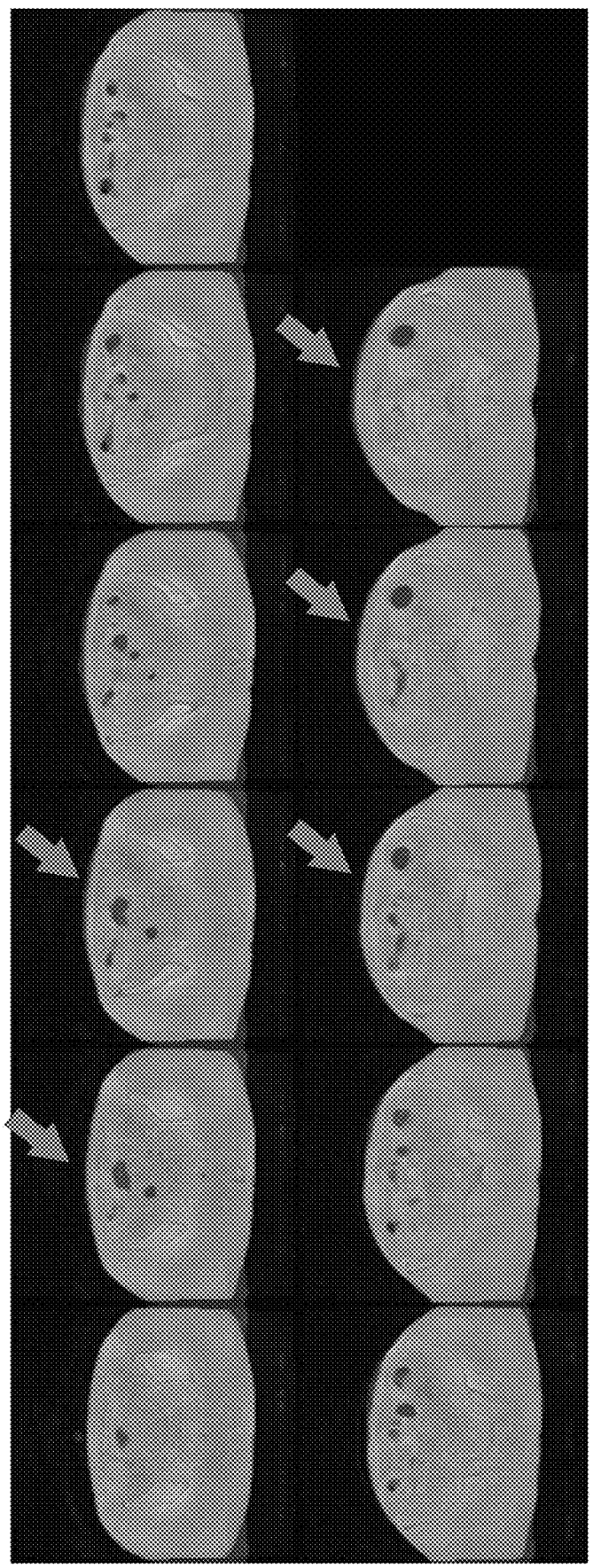
FIG. 13 illustrates an example, non-limiting view of registered images that have undergone modality-neutral machine learning transformation in accordance with one or more embodiments described herein.

FIG. 13 illustrates an example, non-limiting view 1300 of registered images that have undergone modality-neutral machine learning transformation in accordance with one or more embodiments described herein. More specifically, FIG. 13 depicts an overlay of the CT voxel array 202 and the MRI voxel array 204, after registration via modality-neutral machine learning transformation has been performed on the CT voxel array 202 and the MRI voxel array 204. As those having ordinary skill in the art will appreciate, the overlay of FIG. 13 illustrates much more well-aligned boundaries as compared to the overlay of FIG. 12. Indeed, the green arrows of FIG. 13 point out various boundaries that are better-aligned than those in FIG. 12. Moreover, the present inventors computed a mutual information score of 0.71 for the overlay depicted in FIG. 13, which is significantly better than the mutual information score of 0.64 for the overlay depicted in FIG. 12. In fact, the present inventors experimentally verified that the registration accuracy of various embodiments described herein is comparable to benchmarked state-of-the-art analytical registration techniques.

As described above, the machine learning model 402 can be configured to receive as input the movable image 104 and the fixed image 106, and to produce as output the modality-neutral movable image 404 and the modality-neutral fixed image 406. In order to facilitate such functionality, the machine learning model 402 should first be trained. In various cases, the machine learning model 402 can be trained in an unsupervised fashion, as described with respect to FIGS. 14-16.

Figure 14:
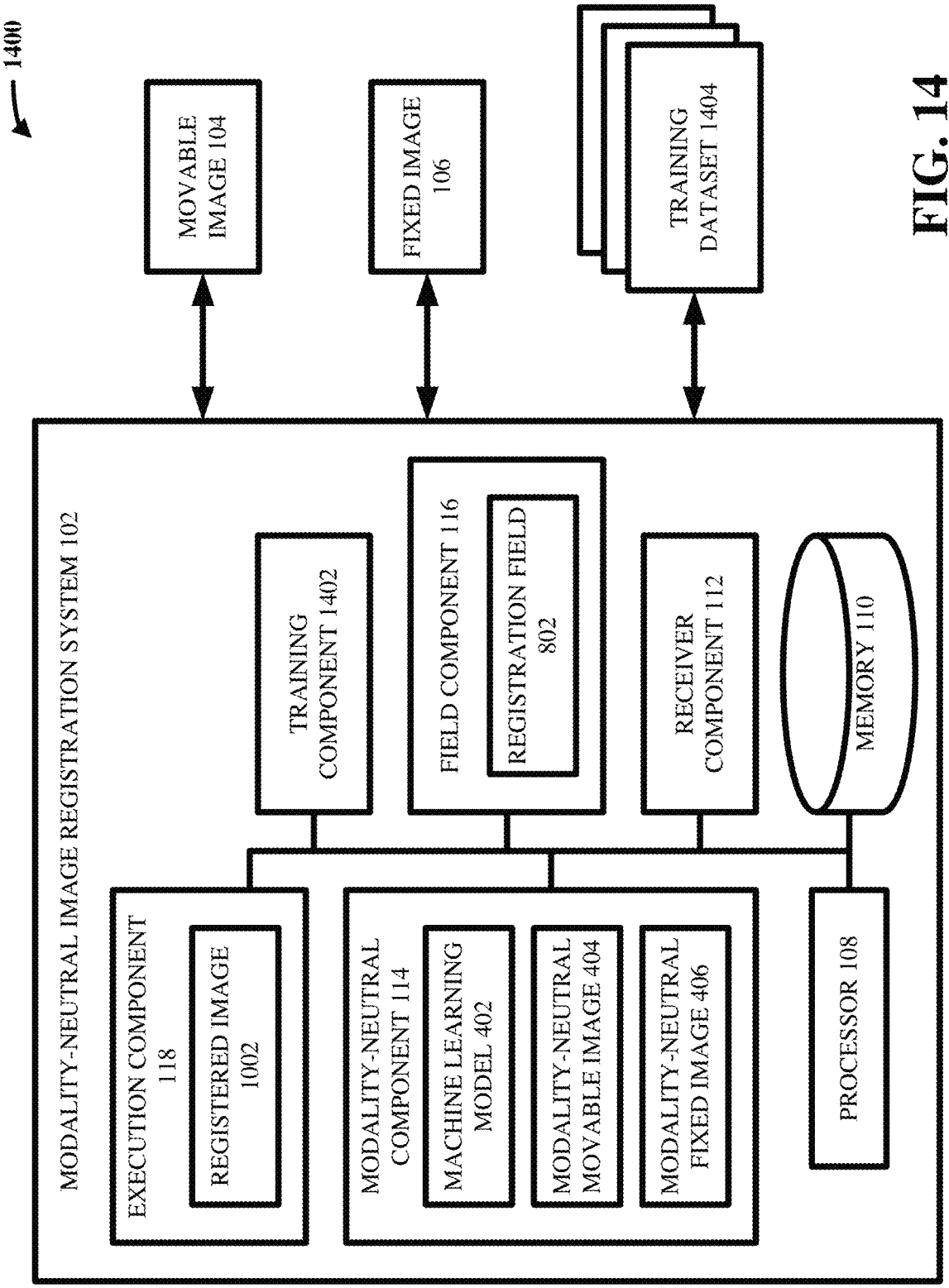
FIG. 14 illustrates a block diagram of an example, non-limiting system including a training component and a training dataset that facilitates multi-modal image registration via modality-neutral machine learning transformation in accordance with one or more embodiments described herein.

FIG. 14 illustrates a block diagram of an example, non-limiting system 1400 including a training component and a training dataset that can facilitate multi-modal image registration via modality-neutral machine learning transformation in accordance with one or more embodiments described herein. As shown, the system 1400 can, in some cases, comprise the same components as the system 1000, and can further comprise a training component 1402 and/or a training dataset 1404.

Figure 15:
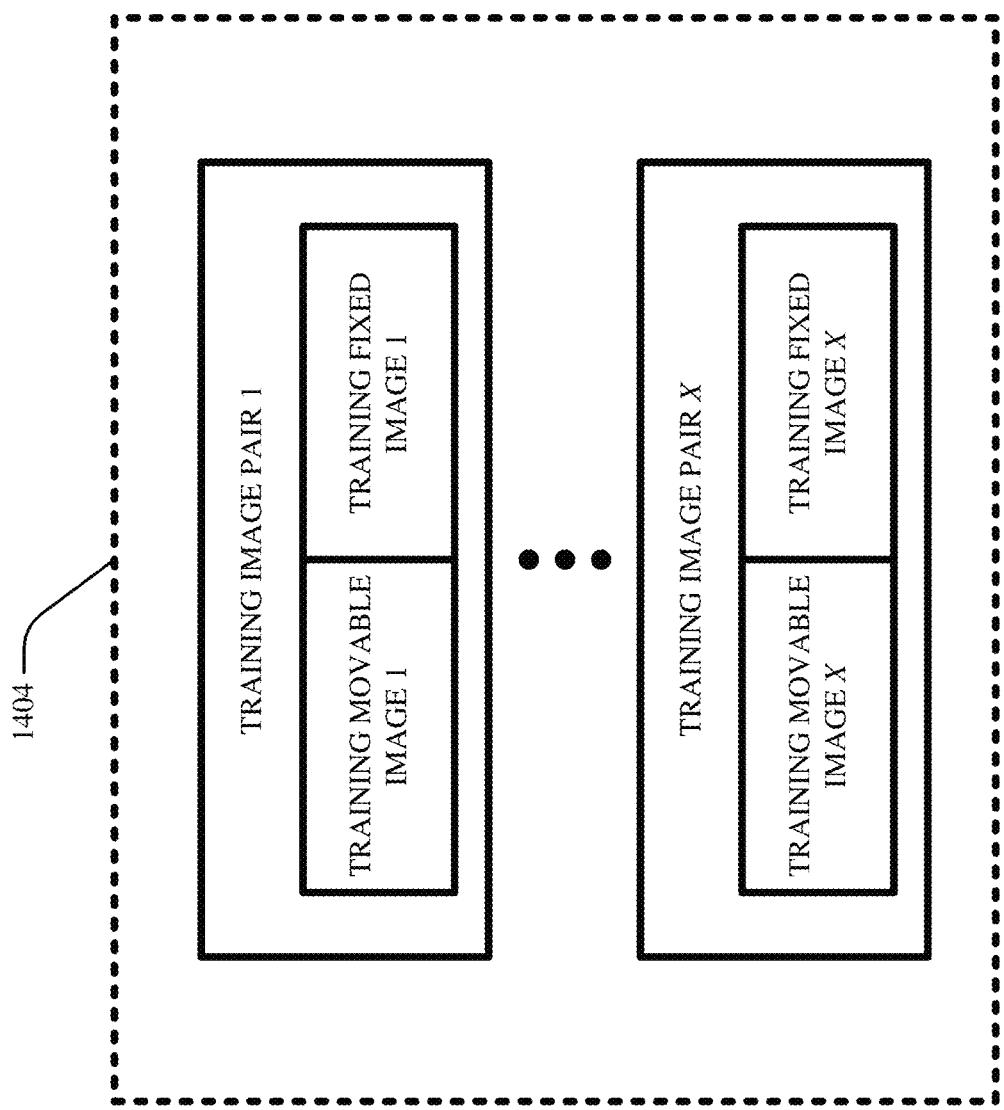
FIG. 15 illustrates an example, non-limiting block diagram of a training dataset in accordance with one or more embodiments described herein.
Figure 16:
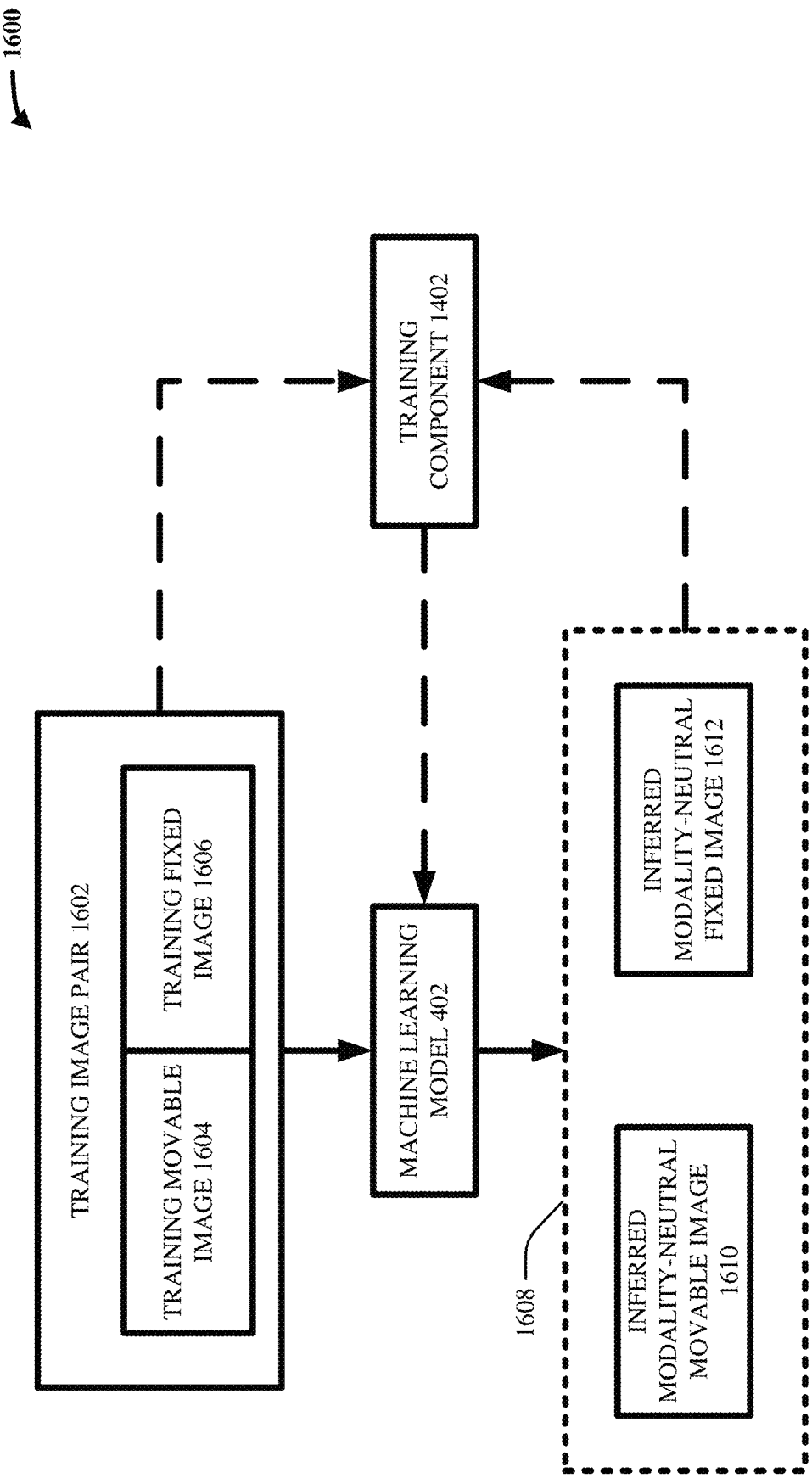
FIG. 16 illustrates an example, non-limiting block diagram showing how a machine learning model can be trained on a training dataset in accordance with one or more embodiments described herein.

In various embodiments, the receiver component 112 can electronically receive and/or access the training dataset 1404, and the training component 1402 can electronically train the machine learning model 402 on the training dataset 1404, as described with respect to FIGS. 15-16.

FIG. 15 illustrates an example, non-limiting block diagram 1500 of a training dataset in accordance with one or more embodiments described herein. In other words, FIG. 15 depicts a non-limiting example embodiment of the training dataset 1404.

In various aspects, the training dataset 1404 can include any suitable number of training image pairs. For instance, as shown, the training dataset 1404 can include x image pairs for any suitable positive integer x: a training image pair 1 to a training image pair x. In various instances, each training image pair can include a movable image having the same size (e.g., s-by-t pixel array, and/or s-by-t-by-u voxel array) as the movable image 104 and a fixed image having the same size as the fixed image 106. For example, the training image pair 1 can include a training movable image 1 and a training fixed image 1. In various aspects, the training movable image 1 can be considered as an image that is to be shifted and/or translated so as to be aligned/registered with the training fixed image 1 (e.g., the training movable image 1 and the training fixed image 1 can be considered as depicting the same features and/or anatomical structures as each other with different positions and/or orientations). As another example, the training image pair x can include a training movable image x and a training fixed image x. In various cases, the training movable image x can be considered as an image that is to be shifted and/or translated so as to be aligned/registered with the training fixed image x (e.g., the training movable image x and the training fixed image x can be considered as depicting the same features and/or anatomical structures as each other with different positions and/or orientations).

FIG. 16 illustrates an example, non-limiting block diagram 1600 showing how the machine learning model 402 can be trained on the training dataset 1404 in accordance with one or more embodiments described herein.

In various embodiments, the internal parameters (e.g., weights, biases) of the machine learning model 402 can be randomly initialized. In various aspects, the training component 1402 can electronically select a training image pair 1602 from the training dataset 1404. As shown, the training image pair 1602 can include a training movable image 1604 and a training fixed image 1606. In various instances, the training component 1402 can electronically feed the training image pair 1602 as input to the machine learning model 402, and this can cause the machine learning model 402 to produce some output 1608. More specifically, the training movable image 1604 and the training fixed image 1606 can be concatenated together, an input layer of the machine learning model 402 can receive such concatenation, such concatenation can complete a forward pass through one or more hidden layers of the machine learning model 402, and an output layer of the machine learning model 402 can compute the output 1608 based on activations provided by the one or more hidden layers of the machine learning model 402.

As shown, the output 1608 can include an inferred modality-neutral movable image 1610 and an inferred modality-neutral fixed image 1612. In various cases, the inferred modality-neutral movable image 1610 can be considered as being what the machine learning model 402 believes is the modality-neutral representation of the training movable image 1604. Similarly, the inferred modality-neutral fixed image 1612 can be considered as being what the machine learning model 402 believes is the modality-neutral representation of the training fixed image 1606. Note that, if the machine learning model 402 has so far undergone no and/or little training, then the inferred modality-neutral movable image 1610 and/or the inferred modality-neutral fixed image 1612 can be highly inaccurate.

In any case, the training component 1402 can compute an error and/or loss based on the output 1608 and/or based on the training image pair 1602. In various cases, any suitable loss function can be implemented. As a non-limiting example, the loss function can be given as follows:

$$L = \alpha \times MSE(g(I_a), g(I_b)) + \beta \times h(g(I_a), g(I_b)) + \gamma \times [d(g(I_a), I_a) + d(g(I_b), I_b)]$$

In this formula, the listed variables can have the following meanings: $I_a$ can represent the training movable image 1604 (e.g., can represent an image captured according to an imaging modality a); $I_b$ can represent the training fixed image 1606 (e.g., can represent an image captured according to an imaging modality b that is different from the imaging modality a); L can represent the computed loss and/or error value; $g(I_a)$ can represent the inferred modality-neutral movable image 1610 (e.g., can represent the modality-neutral version of $I_a$); $g(I_b)$ can represent the inferred modality-neutral fixed image 1612 (e.g., can represent the modality-neutral version of $I_b$); MSE ($g(I_a)$, $g(I_b)$) can represent a pixel-wise and/or voxel-wise mean squared error between $g(I_a)$ and $g(I_b)$; $h(g(I_a), g(I_b))$ can represent a histogram-based error between $g(I_a)$ and $g(I_b)$ (e.g., can represent a difference between an intensity distribution of $g(I_a)$ and an intensity distribution of $g(I_b)$); $d(g(I_a), I_a)$ can represent any suitable distance function that quantifies a difference between $g(I_a)$ and $I_a$; $d(g(I_b), I_b)$ can represent any suitable distance function that quantifies a difference between $g(I_b)$ and $I_b$; and $\alpha$, $\beta$, and $\gamma$ can be any suitable scalar weights.

Accordingly, the above loss function can be considered as comprising three separate terms. The first term, MSE ($g(I_a)$, $g(I_b)$), can be considered as quantifying how different the inferred modality-neutral movable image 1610 is from the inferred modality-neutral fixed image 1612. Those having ordinary skill in the art will understand how to compute mean squared error between two images.

The second term, $h(g(I_a), g(I_b))$, can be considered as quantifying how different the pixel/voxel intensity distribution of the inferred modality-neutral movable image 1610 is as compared to the pixel/voxel intensity distribution of the inferred modality-neutral fixed image 1612. As a non-limiting example, the training component 1402 can compute this difference (e.g., can compute $h(g(I_a), g(I_b))$) as follows: the training component can compute, for any suitable positive integer k, a k-bin frequency histogram describing the pixel/voxel intensity distribution of the inferred modality-neutral movable image 1610; the training component 1402 can compute a k-bin frequency histogram describing the pixel/voxel intensity distribution of the inferred modality-neutral fixed image 1612; the training component 1402 can compute k bin-wise absolute value differences between the frequency histogram describing the pixel/voxel intensity distribution of the inferred modality-neutral movable image 1610 and the frequency histogram describing the pixel/voxel intensity distribution of the inferred modality-neutral fixed image 1612; and the training component 1402 can finally sum together all of such k bin-wise absolute value differences. In other words, $h(g(I_a), g(I_b))$ can be given as follows:

$$h(g(I_a), g(I_b)) = \sum_{i=1}^{k} |H_{g(I_a)}(i) - H_{g(I_b)}(i)|$$

where i is a summation index, where $H_{g(I_a)}$ represents the frequency histogram describing the pixel/voxel intensity distribution of $g(I_a)$, where $H_{g(I_b)}$ represents the frequency histogram describing the pixel/voxel intensity distribution of $g(I_b)$, where $H_{g(I_a)}(i)$ represents the i-th bin in $H_{g(I_a)}$, where $H_{g(I_b)}(i)$ represents the i-th bin in $H_{g(I_b)}$, and where k is the total number of histogram bins within each of $H_{g(I_a)}$ and $H_{g(I_b)}$. As those having ordinary skill in the art will appreciate, $h(g(I_a), g(I_b))$ can be computed via any other suitable histogram matching function and/or histogram difference function, as desired. In any case, inclusion of this second term, $h(g(I_a), g(I_b))$, in the loss function can help to ensure that the outputs produced by the machine learning model 402 have sufficiently similar pixel/voxel intensity distributions as each other.

The third term, $[d(g(I_a), I_a)+d(g(I_b), I_b)]$, can comprise two differences: a first difference $d(g(I_a), I_a)$, and a second difference $d(g(I_b), I_b)$. In various aspects, the first difference $d(g(I_a), I_a)$ can represent how different the inferred modality-neutral movable image 1610 is from the training movable image 1604 (e.g., how different $g(I_a)$ is from $I_a$). In some cases, this first difference can be a cross-correlation score between $g(I_a)$ and $I_a$ and/or a mutual information score between $g(I_a)$ and $I_a$. In other cases, this first difference can be computed based on distances between landmarks and/or edges that are present within $g(I_a)$ and $I_a$. In still other cases, this first difference can be computed based on cosine similarity (e.g., unity minus cosine similarity) between $g(I_a)$ and $I_a$. In various aspects, any other suitable distance function and/or similarity function can be implemented to compute this first difference. Likewise, the second difference $d(g(I_b), I_b)$ can represent how different the inferred modality-neutral fixed image 1612 is from the training fixed image 1606 (e.g., how different $g(I_b)$ is from $I_b$). In some cases, this second difference can be a cross-correlation score between $g(I_b)$ and $I_b$ and/or a mutual information score between $g(I_b)$ and $I_b$. In other cases, this second difference can be computed based on distances between landmarks and/or edges that are present within $g(I_b)$ and $I_b$. In still other cases, this second difference can be computed based on cosine similarity (e.g., unity minus cosine similarity) between $g(I_b)$ and $I_b$. In various aspects, any other suitable distance function and/or similarity function can be implemented to compute this third difference. In any case, inclusion of this third term, $[d(g(I_a), I_a)+d(g(I_b), I_b)]$, in the loss function can help to ensure that the outputs produced by the machine learning model 402 maintain and/or preserve the important structural features that are depicted in the inputted pair of multi-modal images (e.g., this third term prevents the machine learning model 402 from simply outputting blank images as the modality-neutral versions).

Once the training component 1402 computes the loss and/or error as described above, the training component 1402 can update the internal parameters (e.g., weight matrices, bias values) of the machine learning model 402 by performing backpropagation based on such computed loss and/or error.

In various aspects, the training component 1402 can repeat this training procedure for all of the training image pairs in the training dataset 1404, with the ultimate result being that the internal parameters of the machine learning model 402 can become iteratively optimized to accurately infer modality-neutral versions of inputted multi-modal image pairs. In various cases, any suitable training batch sizes and/or any suitable training termination criteria can be implemented.

Figure 17:
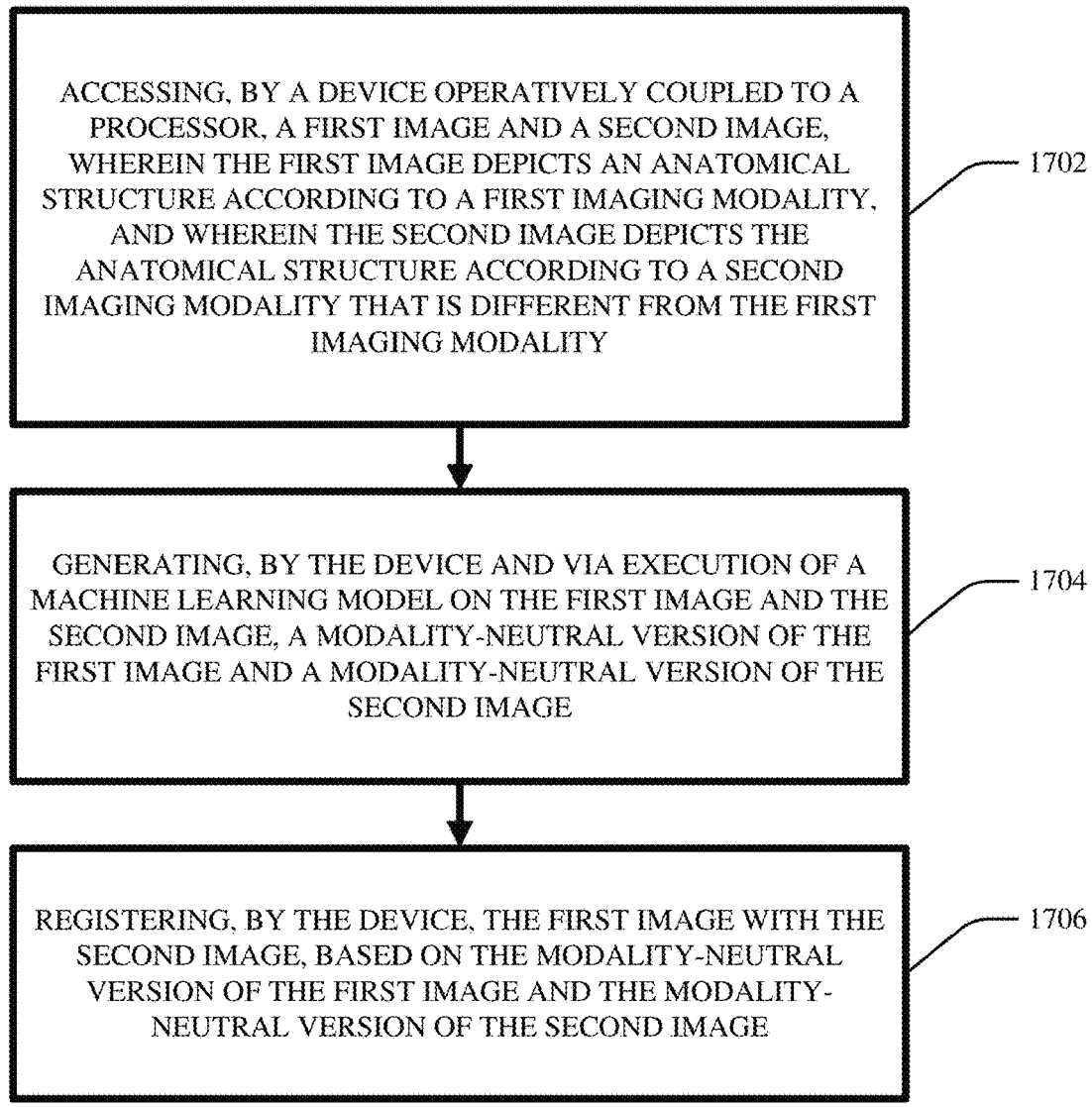
FIG. 17 illustrates a flow diagram of an example, non-limiting computer-implemented method that facilitates multi-modal image registration via modality-neutral machine learning transformation in accordance with one or more embodiments described herein.

FIG. 17 illustrates a flow diagram of an example, non-limiting computer-implemented method 1700 that can facilitate multi-modal image registration via modality-neutral machine learning transformation in accordance with one or more embodiments described herein. In various cases, the modality-neutral image registration system 102 can facilitate the computer-implemented method 1700.

In various embodiments, act 1702 can include accessing, by a device (e.g., via 112) operatively coupled to a processor, a first image (e.g., 104) and a second image (e.g., 106), wherein the first image can depict an anatomical structure according to a first imaging modality (e.g., CT), and wherein the second image can depict the anatomical structure according to a second imaging modality (e.g., MRI) that is different from the first imaging modality.

In various aspects, act 1704 can include generating, by the device (e.g., via 114) and via execution of a machine learning model (e.g., 402) on the first image and the second image, a modality-neutral version of the first image (e.g., 404) and a modality-neutral version of the second image (e.g., 406).

In various instances, act 1706 can include registering, by the device (e.g., via 118), the first image with the second image, based on the modality-neutral version of the first image and the modality-neutral version of the second image.

Although not explicitly shown in FIG. 17, an intensity distribution of the first image can differ by more than a threshold amount from an intensity distribution of the second image (e.g., as shown in FIGS. 2-3), and an intensity distribution of the modality-neutral version of the first image can differ by less than the threshold amount from an intensity distribution of the modality-neutral version of the second image (e.g., as shown in FIGS. 6-7).

Although not explicitly shown in FIG. 17, the machine learning model can be a deep learning neural network, the deep learning neural network can receive as input both the first image and the second image, and the deep learning neural network can produce as output both the modality-neutral version of the first image and the modality-neutral version of the second image (e.g., as shown in FIG. 5).

Although not explicitly shown in FIG. 17, the computer-implemented method 1700 can further include: generating, by the device (e.g., via 116), a registration field (e.g., 802) based on the modality-neutral version of the first image and the modality-neutral version of the second image, wherein the registration field can be a vector field indicating how pixels and/or voxels of the modality-neutral version of the first image should be moved to facilitate registration with the modality-neutral version of the second image; and the registering the first image with the second image can include transforming, by the device (e.g., via 118), the first image according to the registration field (e.g., as shown in FIG. 11).

Although not explicitly shown in FIG. 17, the generating the registration field can include feeding, by the device (e.g., via 116), both the modality-neutral version of the first image and the modality-neutral version of the second image as input to a deep learning registration model (e.g., 906), and the deep learning registration model can produce as output the registration field (e.g., as shown in FIG. 9).

Although not explicitly shown in FIG. 17, the computer-implemented method 1700 can further include: training, by the device (e.g., via 1402), the machine learning model to generate modality-neutral versions of inputted image pairs. In various cases, such training can be facilitated by a loss function that includes: a first error term that is based on a pixel-to-pixel or voxel-to-voxel difference between the modality-neutral version of the first image and the modality-neutral version of the second image (e.g., MSE ($g(I_a)$, $g(I_b)$))); a second error term that is based on an intensity-distribution-to-intensity-distribution difference between the modality-neutral version of the first image and the modality-neutral version of the second image (e.g., h($g(I_a)$, $g(I_b)$))); and a third error term that is based a first difference between the first image and the modality-neutral version of the first image, and that is based on a second difference between the second image and the modality-neutral version of the second image (e.g., [$d(g(I_a), I_a)+d(g(I_b), I_b)$]).

Accordingly, various embodiments described herein include a computerized tool that can receive a pair of multi-modal images that are desired to be registered with each other, can generate, via execution of a trained machine learning model, modality-neutral versions of the pair of multi-modal images, and can register the pair of multi-modal images based on such modality-neutral versions. As described herein, such a computerized tool is able to accurately apply deep learning image registration to multi-modal images, whereas existing techniques are simply not able to do so. Thus, the computerized tool described herein certainly constitutes a useful and practical application of computers.

Although the herein disclosure mainly describes various embodiments of the subject innovation as applying registration fields and/or techniques to the movable image 104 and not to the fixed image 106, this is a mere non-limiting example for ease of explanation. Those having ordinary skill in the art will appreciate that, in various embodiments, when it is desired to register one image (e.g., 104) with another (e.g., 106), both of such images can be shifted and/or transformed rather than just one of those images.

Although the herein disclosure mainly describes various embodiments of the subject innovation as applying to medical images (e.g., X-ray images, CT images, MRI images, ultrasound images, PET images), this is a mere non-limiting example for ease of explanation. Those having ordinary skill in the art will appreciate that the herein described teachings can be applied and/or extrapolated to any suitable images for which registration/alignment is desired.

Although the herein disclosure mainly describes various embodiments of the subject innovation as applying to multi-modal images that exhibit significantly different pixel/voxel intensity distributions, this is a mere non-limiting example for ease of explanation. In various embodiments, the herein-described teachings can be applied to any suitable pair of images that are desired to be registered with each other and that exhibit significantly different pixel/voxel intensity distributions, even if such pair of images are not multi-modal. As a non-limiting example, it is possible that a pair of mono-modal images can exhibit significantly different pixel/voxel intensity distributions as each other. Specifically, a single imaging modality can, in some cases, be implemented in a multi-contrast and/or multi-parametric fashion (e.g., multi-parametric MRI, multi-contrast CT). In such case, the single imaging modality can generate a first image of an anatomical structure according to a first contrast/parametric setting, the single imaging modality can generate a second image of the same anatomical structure according to a second contrast/parametric setting that is different from the first contrast/parametric setting, and the intensity distributions of the first image and the second image can be significantly different due to the first contrast/parametric setting being different from the second contrast/parametric setting. As those having ordinary skill in the art will appreciate, similar situations can arise when images with different acquisition protocols (e.g., resulting in images with significantly different intensity distributions/representations) are desired to be registered and/or when atlas registration is desired to be implemented. That is, various embodiments described herein can be applied to a movable image and to a fixed image that have significantly different intensity distributions, even if such images are captured/generated by the same imaging modality (e.g., two images whose intensity histograms are mismatched by any suitable threshold amount can be considered and/or treated as analogous to multi-modal images, even if such two images are actually mono-modal).

In various instances, machine learning algorithms and/or models can be implemented in any suitable way to facilitate any suitable aspects described herein. To facilitate some of the above-described machine learning aspects of various embodiments of the subject innovation, consider the following discussion of artificial intelligence (AI). Various embodiments of the present innovation herein can employ artificial intelligence to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z_1, z_2, z_3, z_4, z_n)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Those having ordinary skill in the art will appreciate that the herein disclosure describes non-limiting examples of various embodiments of the subject innovation. For ease of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular object and/or component, it should be understood that this is a non-limiting example of various embodiments of the subject innovation, and it should be further understood that, in various other embodiments of the subject innovation, it can be the case that such description applies to fewer than "each" of that particular object and/or component.

Figure 18:
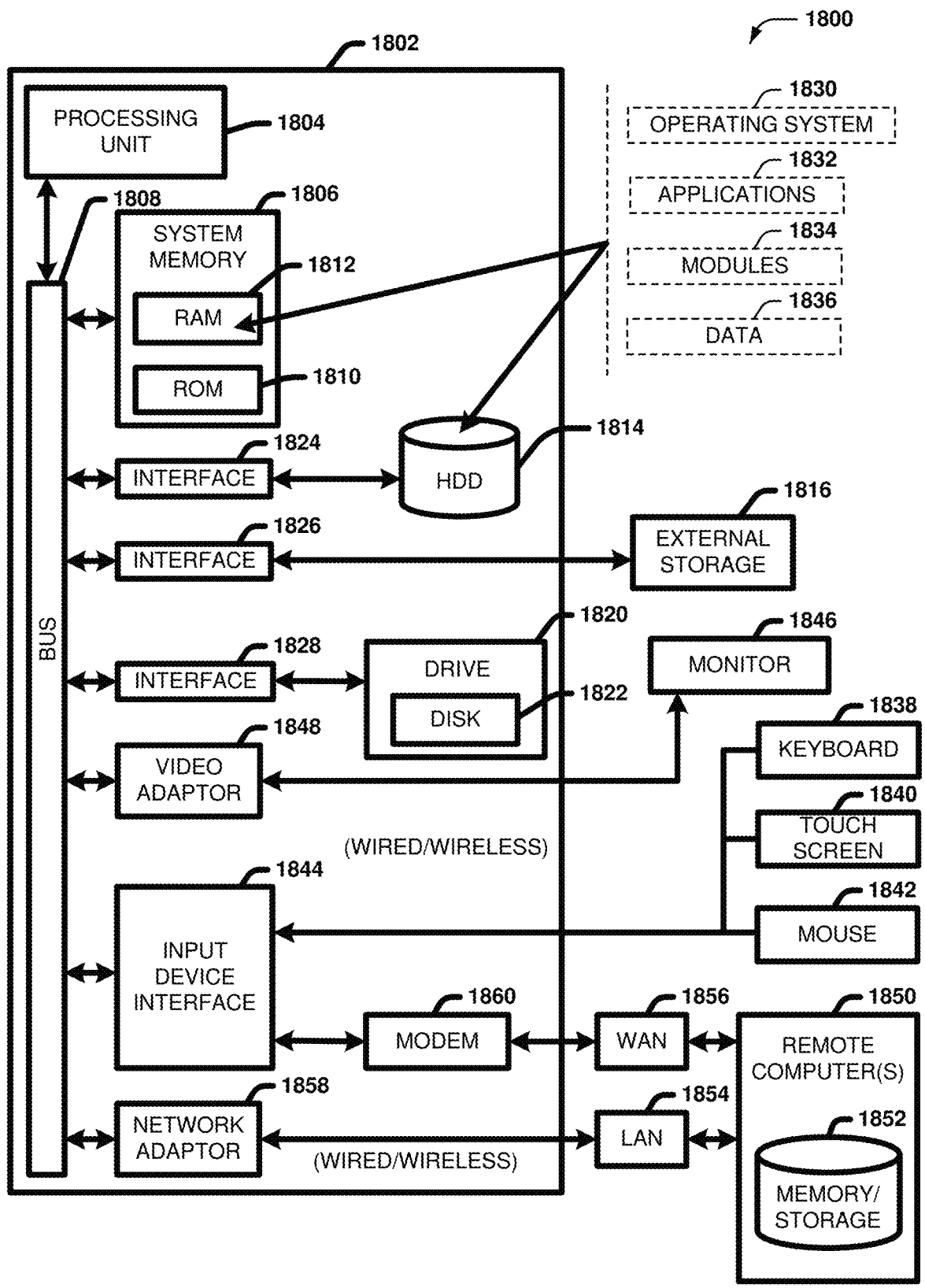
FIG. 18 illustrates a block diagram of an example, non-limiting operating environment in which one or more embodiments described herein can be facilitated.

In order to provide additional context for various embodiments described herein, FIG. 18 and the following discussion are intended to provide a brief, general description of a suitable computing environment 1800 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 18, the example environment 1800 for implementing various embodiments of the aspects described herein includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures can also be employed as the processing unit 1804.

The system bus 1808 can be any of several types of bus structure that can further interconnect to a memory bus (with or without a memory controller), a peripheral bus, and a local bus using any of a variety of commercially available bus architectures. The system memory 1806 includes ROM 1810 and RAM 1812. A basic input/output system (BIOS) can be stored in a non-volatile memory such as ROM, erasable programmable read only memory (EPROM), EEPROM, which BIOS contains the basic routines that help to transfer information between elements within the computer 1802, such as during startup. The RAM 1812 can also include a high-speed RAM such as static RAM for caching data.

The computer 1802 further includes an internal hard disk drive (HDD) 1814 (e.g., EIDE, SATA), one or more external storage devices 1816 (e.g., a magnetic floppy disk drive (FDD) 1816, a memory stick or flash drive reader, a memory card reader, etc.) and a drive 1820, e.g., such as a solid state drive, an optical disk drive, which can read or write from a disk 1822, such as a CD-ROM disc, a DVD, a BD, etc. Alternatively, where a solid state drive is involved, disk 1822 would not be included, unless separate. While the internal HDD 1814 is illustrated as located within the computer 1802, the internal HDD 1814 can also be configured for external use in a suitable chassis (not shown). Additionally, while not shown in environment 1800, a solid state drive (SSD) could be used in addition to, or in place of, an HDD 1814. The HDD 1814, external storage device(s) 1816 and drive 1820 can be connected to the system bus 1808 by an HDD interface 1824, an external storage interface 1826 and a drive interface 1828, respectively. The interface 1824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. The systems and methods described herein can be implemented utilizing various commercially available operating systems or combinations of operating systems.

Computer 1802 can optionally comprise emulation technologies. For example, a hypervisor (not shown) or other intermediary can emulate a hardware environment for operating system 1830, and the emulated hardware can optionally be different from the hardware illustrated in FIG. 18. In such an embodiment, operating system 1830 can comprise one virtual machine (VM) of multiple VMs hosted at computer 1802. Furthermore, operating system 1830 can provide runtime environments, such as the Java runtime environment or the .NET framework, for applications 1832. Runtime environments are consistent execution environments that allow applications 1832 to run on any operating system that includes the runtime environment. Similarly, operating system 1830 can support containers, and applications 1832 can be in the form of containers, which are lightweight, standalone, executable packages of software that include, e.g., code, runtime, system tools, system libraries and settings for an application.

Further, computer 1802 can be enable with a security module, such as a trusted processing module (TPM). For instance with a TPM, boot components hash next in time boot components, and wait for a match of results to secured values, before loading a next boot component. This process can take place at any layer in the code execution stack of computer 1802, e.g., applied at the application execution level or at the operating system (OS) kernel level, thereby enabling security at any level of code execution.

A user can enter commands and information into the computer 1802 through one or more wired/wireless input devices, e.g., a keyboard 1838, a touch screen 1840, and a pointing device, such as a mouse 1842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1804 through an input device interface 1844 that can be coupled to the system bus 1808, but can be connected by other interfaces, such as a parallel port, an IEEE 1394 serial port, a game port, a USB port, an IR interface, a BLUETOOTH® interface, etc.

A monitor 1846 or other type of display device can be also connected to the system bus 1808 via an interface, such as a video adapter 1848. In addition to the monitor 1846, a computer typically includes other peripheral output devices (not shown), such as speakers, printers, etc.

The computer 1802 can operate in a networked environment using logical connections via wired and/or wireless communications to one or more remote computers, such as a remote computer(s) 1850. The remote computer(s) 1850 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1852 is illustrated. The logical connections depicted include wired/wireless connectivity to a local area network (LAN) 1854 and/or larger networks, e.g., a wide area network (WAN) 1856. Such LAN and WAN networking environments are commonplace in offices and companies, and facilitate enterprise-wide computer networks, such as intranets, all of which can connect to a global communications network, e.g., the Internet.

When used in a LAN networking environment, the computer 1802 can be connected to the local network 1854 through a wired and/or wireless communication network interface or adapter 1858. The adapter 1858 can facilitate wired or wireless communication to the LAN 1854, which can also include a wireless access point (AP) disposed thereon for communicating with the adapter 1858 in a wireless mode.

When used in a WAN networking environment, the computer 1802 can include a modem 1860 or can be connected to a communications server on the WAN 1856 via other means for establishing communications over the WAN 1856, such as by way of the Internet. The modem 1860, which can be internal or external and a wired or wireless device, can be connected to the system bus 1808 via the input device interface 1844. In a networked environment, program modules depicted relative to the computer 1802 or portions thereof, can be stored in the remote memory/storage device 1852. It will be appreciated that the network connections shown are example and other means of establishing a communications link between the computers can be used.

When used in either a LAN or WAN networking environment, the computer 1802 can access cloud storage systems or other network-based storage systems in addition to, or in place of, external storage devices 1816 as described above, such as but not limited to a network virtual machine providing one or more aspects of storage or processing of information. Generally, a connection between the computer 1802 and a cloud storage system can be established over a LAN 1854 or WAN 1856 e.g., by the adapter 1858 or modem 1860, respectively. Upon connecting the computer 1802 to an associated cloud storage system, the external storage interface 1826 can, with the aid of the adapter 1858 and/or modem 1860, manage storage provided by the cloud storage system as it would other types of external storage. For instance, the external storage interface 1826 can be configured to provide access to cloud storage sources as if those sources were physically connected to the computer 1802.

The computer 1802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 19:
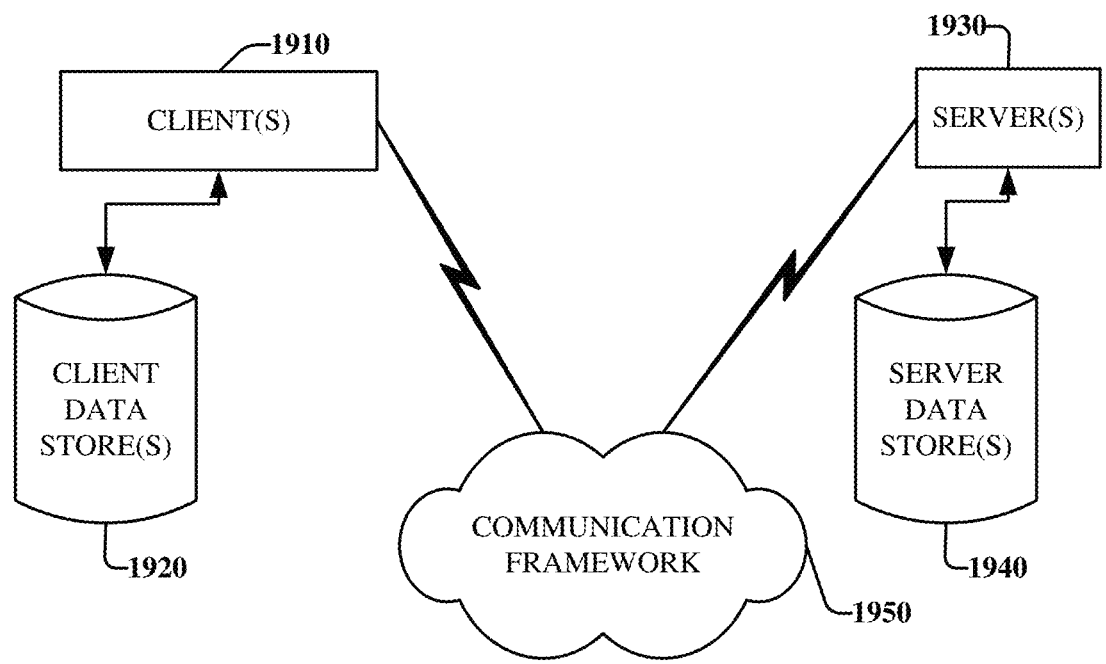
FIG. 19 illustrates an example networking environment operable to execute various implementations described herein.

FIG. 19 is a schematic block diagram of a sample computing environment 1900 with which the disclosed subject matter can interact. The sample computing environment 1900 includes one or more client(s) 1910. The client(s) 1910 can be hardware and/or software (e.g., threads, processes, computing devices). The sample computing environment 1900 also includes one or more server(s) 1930. The server(s) 1930 can also be hardware and/or software (e.g., threads, processes, computing devices). The servers 1930 can house threads to perform transformations by employing one or more embodiments as described herein, for example. One possible communication between a client 1910 and a server 1930 can be in the form of a data packet adapted to be transmitted between two or more computer processes. The sample computing environment 1900 includes a communication framework 1950 that can be employed to facilitate communications between the client(s) 1910 and the server(s) 1930. The client(s) 1910 are operably connected to one or more client data store(s) 1920 that can be employed to store information local to the client(s) 1910. Similarly, the server(s) 1930 are operably connected to one or more server data store(s) 1940 that can be employed to store information local to the servers 1930.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
  a processor that executes computer-executable components stored in a computer-readable memory, the computer-executable components comprising:
    a receiver component that accesses a first image and a second image, wherein the first image depicts an anatomical structure according to a first imaging modality, and wherein the second image depicts the anatomical structure according to a second imaging modality that is different from the first imaging modality;
    a modality-neutral component that generates, via execution of a machine learning model on the first image and the second image, a modality-neutral version of the first image and a modality-neutral version of the second image; and
    an execution component that registers the first image with the second image, based on the modality-neutral version of the first image and the modality-neutral version of the second image, wherein the machine learning model is a deep learning neural network, wherein the modality-neutral component feeds both the first image and the second image as input to the deep learning neural network, and wherein the deep learning neural network produces as output both the modality-neutral version of the first image and the modality-neutral version of the second image.

2. The system of claim 1, wherein an intensity distribution of the first image differs by more than a threshold amount from an intensity distribution of the second image, and wherein an intensity distribution of the modality-neutral version of the first image differs by less than the threshold amount from an intensity distribution of the modality-neutral version of the second image.

3. The system of claim 1, wherein the computer-executable components further comprise:
  a field component that generates a registration field based on the modality-neutral version of the first image and the modality-neutral version of the second image, wherein the registration field is a vector field indicating how pixels or voxels of the modality-neutral version of the first image should be moved to facilitate registration with the modality-neutral version of the second image, and wherein the execution component registers the first image with the second image by transforming the first image according to the registration field.

4. The system of claim 3, wherein the field component feeds both the modality-neutral version of the first image and the modality-neutral version of the second image as input to a deep learning registration model, and wherein the deep learning registration model produces as output the registration field.

5. The system of claim 1, wherein the computer-executable components further comprise:
a training component that trains the machine learning model to generate modality-neutral versions of inputted image pairs.

6. The system of claim 5, wherein the training component trains the machine learning model via a loss function that includes:
a first error term that is based on a pixel-to-pixel or voxel-to-voxel difference between the modality-neutral version of the first image and the modality-neutral version of the second image;
a second error term that is based on an intensity-distribution-to-intensity-distribution difference between the modality-neutral version of the first image and the modality-neutral version of the second image; and
a third error term that is based a first difference between the first image and the modality-neutral version of the first image, and that is based on a second difference between the second image and the modality-neutral version of the second image.

7. The system of claim 1, wherein the first imaging modality is one of a computed tomography imaging modality, a magnetic resonance imaging modality, an ultrasound imaging modality, an X-ray imaging modality, or a positron emission tomography imaging modality, and wherein the second imaging modality is a different one of the computed tomography imaging modality, the magnetic resonance imaging modality, the ultrasound imaging modality, the X-ray imaging modality, or the positron emission tomography imaging modality.

8. A computer-implemented method, comprising:
accessing, by a device operatively coupled to a processor, a first image and a second image, wherein the first image depicts an anatomical structure according to a first imaging modality, and wherein the second image depicts the anatomical structure according to a second imaging modality that is different from the first imaging modality;
generating, by the device and via execution of a machine learning model on the first image and the second image, a modality-neutral version of the first image and a modality-neutral version of the second image; and
registering, by the device, the first image with the second image, based on the modality-neutral version of the first image and the modality-neutral version of the second image, wherein the machine learning model is a deep learning neural network, wherein the deep learning neural network receives as input both the first image and the second image, and wherein the deep learning neural network produces as output both the modality-neutral version of the first image and the modality-neutral version of the second image.

9. The computer-implemented method of claim 8, wherein an intensity distribution of the first image differs by more than a threshold amount from an intensity distribution of the second image, and wherein an intensity distribution of the modality-neutral version of the first image differs by less than the threshold amount from an intensity distribution of the modality-neutral version of the second image.

10. The computer-implemented method of claim 8, further comprising:
generating, by the device, a registration field based on the modality-neutral version of the first image and the modality-neutral version of the second image, wherein the registration field is a vector field indicating how pixels or voxels of the modality-neutral version of the first image should be moved to facilitate registration with the modality-neutral version of the second image; and
wherein the registering the first image with the second image includes transforming, by the device, the first image according to the registration field.

11. The computer-implemented method of claim 10, wherein the generating the registration field includes feeding, by the device, both the modality-neutral version of the first image and the modality-neutral version of the second image as input to a deep learning registration model, and wherein the deep learning registration model produces as output the registration field.

12. The computer-implemented method of claim 8, further comprising:
training, by the device, the machine learning model to generate modality-neutral versions of inputted image pairs.

13. The computer-implemented method of claim 12, wherein the training the machine learning model is facilitated by a loss function that includes:
a first error term that is based on a pixel-to-pixel or voxel-to-voxel difference between the modality-neutral version of the first image and the modality-neutral version of the second image;
a second error term that is based on an intensity-distribution-to-intensity-distribution difference between the modality-neutral version of the first image and the modality-neutral version of the second image; and
a third error term that is based a first difference between the first image and the modality-neutral version of the first image, and that is based on a second difference between the second image and the modality-neutral version of the second image.

14. The computer-implemented method of claim 8, wherein the first imaging modality is one of a computed tomography imaging modality, a magnetic resonance imaging modality, an ultrasound imaging modality, an X-ray imaging modality, or a positron emission tomography imaging modality, and wherein the second imaging modality is a different one of the computed tomography imaging modality, the magnetic resonance imaging modality, the ultrasound imaging modality, the X-ray imaging modality, or the positron emission tomography imaging modality.

15. A non-transitory computer-readable medium for facilitating multi-modal image registration via modality-neutral machine learning transformation, the non-transitory computer-readable medium comprising a computer-readable memory having program instructions embodied therewith, the program instructions executable by a processor to cause the processor to:
access a first image and a second image, wherein the first image depicts an anatomical structure according to a first intensity distribution, and wherein the second image depicts the anatomical structure according to a second intensity distribution that differs by more than a threshold amount from the first intensity distribution;
generate, via execution of a machine learning model on the first image and the second image, a modality-neutral version of the first image and a modality-neutral version of the second image, wherein an intensity distribution of the modality-neutral version of the first image differs by less than the threshold amount from an intensity distribution of the modality-neutral version of the second image; and register the first image with the second image, based on the modality-neutral version of the first image and the modality-neutral version of the second image, wherein the machine learning model is a deep learning neural network, wherein the processor feeds both the first image and the second image as input to the deep learning neural network, and wherein the deep learning neural network produces as output both the modality-neutral version of the first image and the modality-neutral version of the second image.

16. The non-transitory computer-readable medium of claim 15, wherein the first image is associated with a first contrast setting or parametric setting of an imaging modality, wherein the second image is associated with a second contrast setting or parametric setting of the imaging modality that is different from the first contrast setting or parametric setting, and wherein the first contrast setting or parametric setting being different from the second contrast setting or parametric setting causes the first intensity distribution to differ from the second intensity distribution by more than the threshold amount.

17. The non-transitory computer-readable medium of claim 15, wherein the program instructions are further executable to cause the processor to:

generate a registration field based on the modality-neutral version of the first image and the modality-neutral version of the second image, wherein the registration field is a vector field indicating how pixels or voxels of the modality-neutral version of the first image should be moved to facilitate registration with the modality-neutral version of the second image, and wherein the processor registers the first image with the second image by transforming the first image according to the registration field.

* * * * *